(12) United States Patent
Shibuya et al.

(10) Patent No.: US 11,569,867 B2
(45) Date of Patent: *Jan. 31, 2023

(54) POWER LINE COMMUNICATION DEVICE

(71) Applicant: RENESAS ELECTRONICS CORPORATION, Tokyo (JP)

(72) Inventors: Kosuke Shibuya, Tokyo (JP); Yoshitaka Shibuya, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,914

(22) Filed: Sep. 14, 2021

(65) Prior Publication Data

US 2021/0409069 A1    Dec. 30, 2021

Related U.S. Application Data

(62) Division of application No. 16/719,452, filed on Dec. 18, 2019, now Pat. No. 11,146,309.

(30) Foreign Application Priority Data

Dec. 28, 2018 (JP) .............................. JP2018-246549

(51) Int. Cl.
*H04B 3/06* (2006.01)
*H04B 3/46* (2015.01)
(52) U.S. Cl.
CPC .................. *H04B 3/06* (2013.01); *H04B 3/46* (2013.01)
(58) Field of Classification Search
CPC ....................................................... H04B 3/06

USPC .......................................................... 375/227
See application file for complete search history.

(56) References Cited

U.S. PATENT DOCUMENTS

| 11,146,309 B2* | 10/2021 | Shibuya ................... H04B 3/46 |
| 2015/0326279 A1 | 11/2015 | Schneider et al. |
| 2017/0093170 A1 | 3/2017 | Saunamaki |
| 2019/0238182 A1 | 8/2019 | Oh et al. |

FOREIGN PATENT DOCUMENTS

JP        2009-021678 A     1/2009

OTHER PUBLICATIONS

U.S. PTO Non-Final Office Action issued in related parent U.S. Appl. No. 16/719,452, dated Dec. 24, 2020.
U.S. PTO Notice of Allowance issued in related parent U.S. Appl. No. 16/719,452, dated Jun. 15, 2021.
Entire U.S. PTO Image File Wrapper (IFW) associated with related parent U.S. Appl. No. 16/719,452, filed Dec. 18, 2019.

(Continued)

*Primary Examiner* — Lihong Yu
(74) *Attorney, Agent, or Firm* — McDermott Will & Emery LLP

(57) ABSTRACT

The power line communication device detects inverter noise from the voltage waveforms of the power line, and executes the output of the transmission signal in a period in which it is determined that the signal amplitude of the transmission signal in the transmission processing unit exceeds a predetermined value from the output amplitude of the inverter noise, and stops the output of the transmission signal in other periods.

5 Claims, 18 Drawing Sheets

(56) References Cited

OTHER PUBLICATIONS

Andrea M Tonello et al.,"Optimal Time Slot Design in an OFDM-TDMA System over Power-Line Time-Variant Channels", IEEE International Symposium on Power Line Communications and its Applications, 2009, ISPLC 2009, Mar. 29, 2009 (Mar. 29, 2009), pp. 41-46.

Extended European Search Report issued in corresponding European Patent Application No. 19218009.9-1205, dated Jul. 1, 2020.

* cited by examiner

POWER LINE COMMUNICATION DEVICE

CROSS-REFERENCE TO RELATED APPLICATIONS

This is a Divisional of U.S. patent application Ser. No. 16/719,452, filed Dec. 18, 2019, which claims the benefit of Japanese Patent Application No. 2018-246549, filed on Dec. 28, 2018 including the specification, drawings and abstract is incorporated herein by reference in its entirety.

BACKGROUND

The present disclosure relates to a power line communication device, and to a technique for transmitting and receiving signals via a power line.

The environment of the power line communication (hereinafter, also referred to as PLC) varies depending on the location, time, etc., and there are places where noise and impedance are inferior. This is because, unlike wireless communication using a communication channel whose output level is strictly limited by laws or standards, there are many noises generated from various devices connected to a power line in power line communication. For example, in power line communication systems for solar photovoltaic power generation, a DC/AC inverter (hereinafter, also referred to as an inverter) is used to convert DC power into AC power, and periodic noise (hereinafter, also referred to as inverter noise) generated by the DC/AC inverter exists. Even in a power line environment that is strongly affected by this type of periodic noise, it is necessary to perform power line communication with high quality and high efficiency.

In Japanese Unexamined Patent Application Publication No. 2009-021678 (hereinafter, also referred as to Patent Document 1), there is disclosed a power line communication system and a noise component remove control method for modulating and receiving data between PLC modems via a power line by an OFDM method. The PLC modem detects a noise component superimposed on a received signal transmitted and received through a power line by a sub-operational amplifier, an A/D converter, and a fast Fourier transform unit. The carrier spectrum detection circuit, the continuous signal conversion circuit, the fast inverse Fourier transform unit, and the D/A converter generate a cancel signal having the same frequency and opposite phase as the noise component detected in the transmission pause period of a predetermined cycle. An operational amplifier adds the cancel signal and an input received signal to cancel the noise component.

SUMMARY

In the power line communication device described in Patent Document 1, since the cause of noise is not considered, it is not always possible to effectively remove noise with respect to noise of a specific cause, inverter noise in particular. In addition, since there is a need to have two transmission/reception device circuits and the circuit area is increased, there is a room for improvement from the viewpoint of noise elimination effects. Other objects and novel features will become apparent from the description and drawings of this specification.

The power line communication device according to first embodiment compares the signal amplitude of the transmission signal in the transmission processing unit with the output amplitude of the inverter noise detected from the voltage waveforms of the power line to control whether the inverter noise can be outputted or not. The power line communication device executes the output of the transmission signal only in a period in which it is determined that the signal amplitude of the transmission signal in the transmission processing unit exceeds a predetermined value from the output amplitude of the inverter noise, and stops the output of the transmission signal in other periods.

The power line communication device according to another embodiment detects inverter noise from a PLC transmission/reception signal, and performs PLC reception or transmission signal process using characteristics of the inverter noise.

In the power line communication device according to the embodiment, the influence of the inverter noise can be reduced in the power line communication via the power line having the influence of the inverter noise.

DETAILED DESCRIPTION

Figure 1:
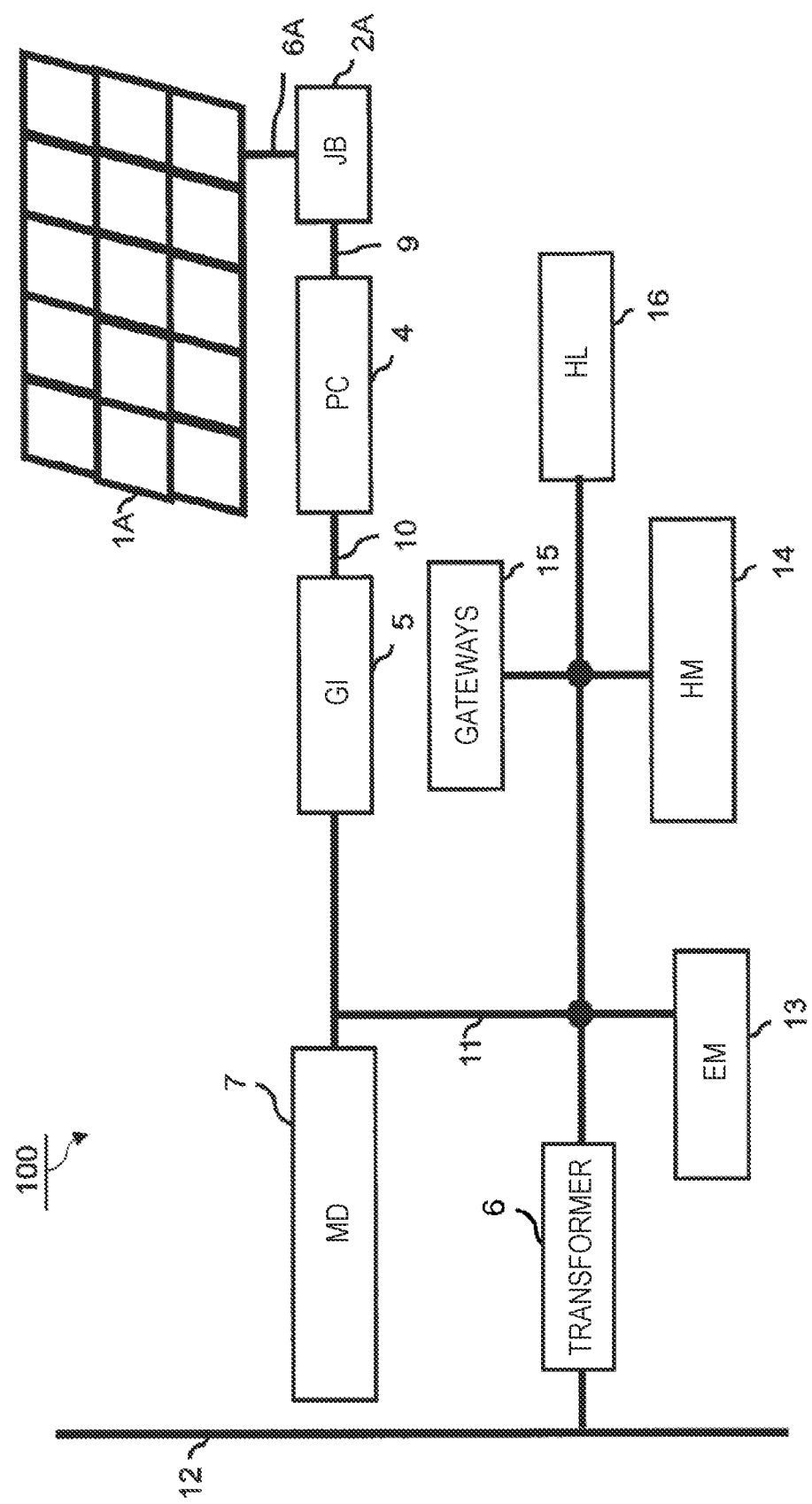
FIG. 1 is a block diagram of the power line communication system.

Hereinafter, a power line communication device according to the present embodiment will be described in detail by referring to the drawings. In the specification and the drawings, the same or corresponding elements are denoted by the same reference numerals, and a repetitive description thereof is omitted. In the drawings, for convenience of description, the configuration may be omitted or simplified. Also, at least some of the embodiments and the modified examples may be arbitrarily combined with each other. In addition, the terms in parentheses attached to each term are abbreviations used in the drawings.

First Embodiment

The power line communication device according to present embodiment may be utilized in systems for solar photovoltaic power generation, wind power generation, hydroelectric power generation, or nuclear power generation. For example, FIG. 1 illustrates a configuration of a solar photovoltaic power generation system according to first embodiment. The solar photovoltaic power generation system 100 includes solar panels 1A, a junction box (JB) 2A, a power converter (PC) 4, a grid interconnection device (GI) 5, a transformer 6, a monitoring device of solar photovoltaic power generation system (MD) 7 (hereinafter monitoring device (MD) 7), an electric meter 13, home appliances (HM) 14, and gateways 15. The system is connected to power lines 6A, 9, 10, and 11, and a power grid 12. A house load (HL) 16 is connected to the power line 11.

In the solar panel 1A, many solar cells are arranged in a panel shape. The junction box (JB) 2A is a device for collecting DC power generated by the solar panels 1A. The power converter (PC) 4 is a device for converting DC power into AC power. The grid interconnection device (GI) 5 is a device for opening and closing the built-in interconnection relays 21 shown in FIG. 3 in accordance with the status of the solar photovoltaic power generation system 100 and the grid. The transformer 6 is a device for converting a voltage of an AC voltage. The monitoring device (MD) 7 is a device for monitoring and controlling the operation of the power converter (PC) 4 and the grid interconnection device (GI) 5. The electric meter 13 is a device for measuring and metering electric power flowing bidirectionally between the power transmission network and the electric power line 11. The home appliances (HM) 14 are various electrical home appliances connected to networks by IoT (Internet of Things) such as air conditioners and refrigerators. The gateways 15 are relay devices for connecting to other networks other than the power line communication, such as Ethernet (not shown in figures). The house load (HL) 16 is a home appliance other than the home appliances (HM) 14 connected to the power line 11.

The solar panels 1A are connected to the junction box (JB) 2A via power lines 6A. The junction box (JB) 2A is connected to the power converter (PC) 4 via a power line 9. The power converter (PC) 4 is connected to the grid interconnection device (GI) 5 via a power line 10. The grid interconnection device (GI) 5 is connected to a transformer 6, a monitoring device (MD) 7, an electric meter 13, home appliances (HM) 14, gateways 15 and house loads (HL) 16 via a power line 11. The transformer 6 is connected to a power grid 12.

The power converter (PC) 4 and power interconnection device (GI) 5 are monitored and controlled by the monitoring device (MD) 7 and the transformer 6 converts the AC voltage to an appropriate voltage for transmission to the power grid 12. In the solar photovoltaic power generation system 100, the power converter (PC) 4, the grid interconnection device (GI) 5, the monitoring device (MD) 7, the electric meter 13, the home appliance (HM) 14 having a power line communication function, and the gateways 15 mutually perform power line communication via the power lines 10 and 11.

Figure 2:
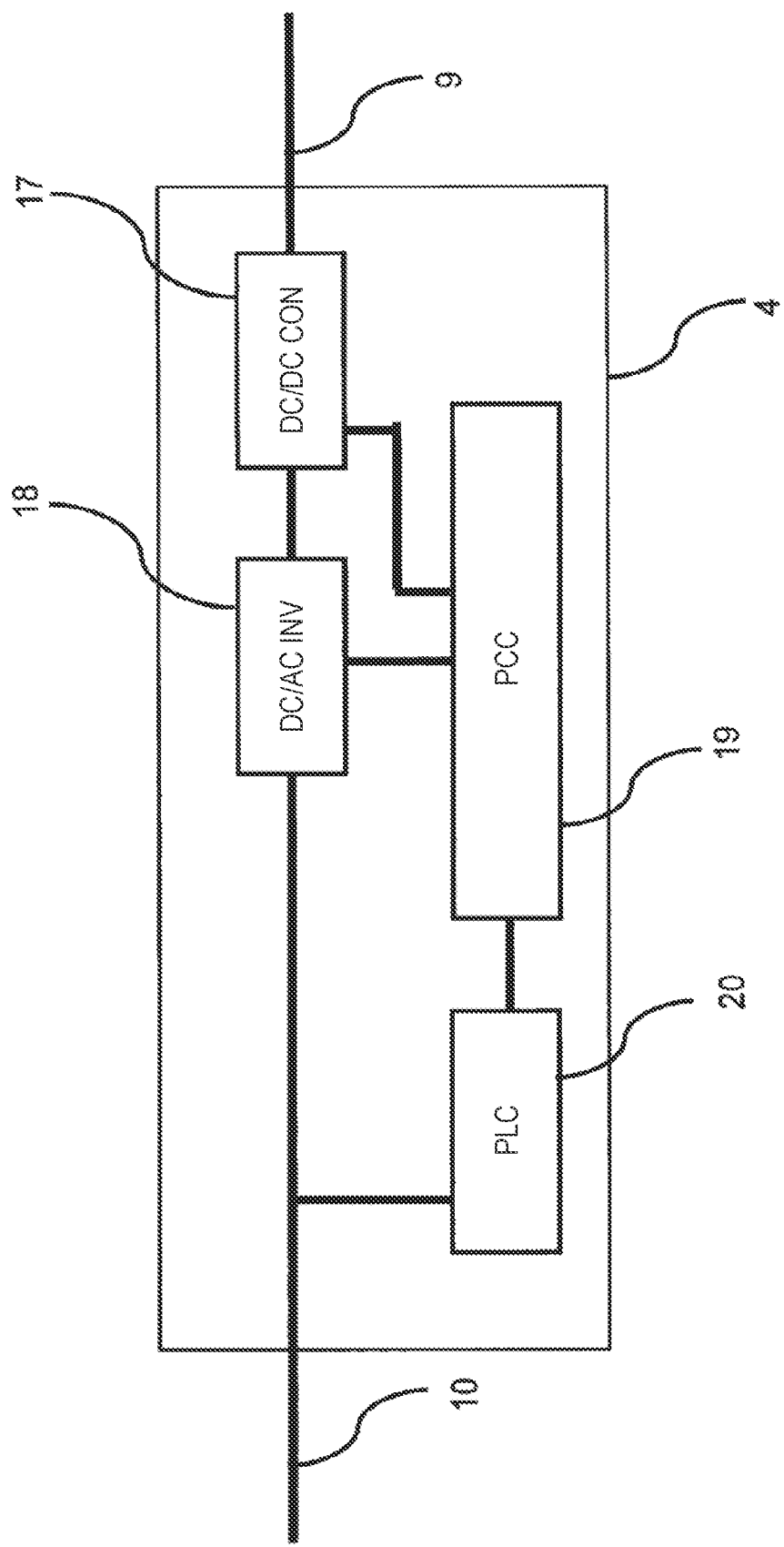
FIG. 2 is a block diagram of a power converter in a power line communication system.

FIG. 2 illustrates a configuration of a power converter (PC) 4 according to first embodiment. The power converter (PC) 4 includes a DC/DC converter (DC/DC CON) 17, a DC/AC inverter (DC/AC INV) 18, a power converting control unit (PCC) 19, and a power line communication device (PLC) 20. The DC power generated by the solar panels 1A and collected in the junction box (JB) 2A is inputted to the power converter (PC) 4 via the power line 9.

The DC/DC converter (DC/DC CON) 17 is a circuit for stabilizing DC voltages of DC power. The DC/AC inverters (DC/AC INV) 18 is a circuit for converting AC power into DC power. The power converting control unit (PCC) 19 is a circuit for controlling the DC/DC converter (DC/DC CON) 17 and the DC/AC inverter (DC/AC INV) 18. The power line communication device (PLC) 20 is a device for transmitting information acquired by the power line communication from the monitoring device (MD) 7 via the power lines 10 and 11 to the power converting control unit (PCC) 19.

The DC/DC converter (DC/DC CON) 17 is connected to the power line 9, the DC/AC inverter (DC/AC INV) 18, and the power converting control unit (PCC) 19. The DC/AC inverter (DC/AC INV) 18 is connected to the DC/DC converter (DC/DC CON) 17, the power converting control unit (PCC) 19, and the power line 10. The power converter control unit (PCC) 19 is connected to the DC/DC converter (DC/DC CON) 17, the DC/AC inverter (DC/AC INV) 18, and the power line communication device (PLC) 20. The power line communication device (PLC) 20 is connected to the power line 10 and the power converting control unit (PCC) 19.

The DC power inputted from the power line 9 is stabilized by the DC/DC converter (DC/DC CON) 17, converted from DC power to AC power by the DC/AC inverter (DC/AC INV) 18, and outputted to the power line 10. The operations of the DC/DC converter (DC/DC CON) 17 and the DC/AC inverter (DC/AC INV) 18 are controlled by a power converter control unit (PCC) 19. In order to increase efficiency the operation of the power converter (PC) 4, the power line communication device (PLC) 20 acquires information of the status of the solar photovoltaic power generation and grid from the monitoring device (MD) 7 by the power line communication, and transmits the information to the power converting control unit (PCC) 19.

Grid Intercommunication Device

Figure 3:
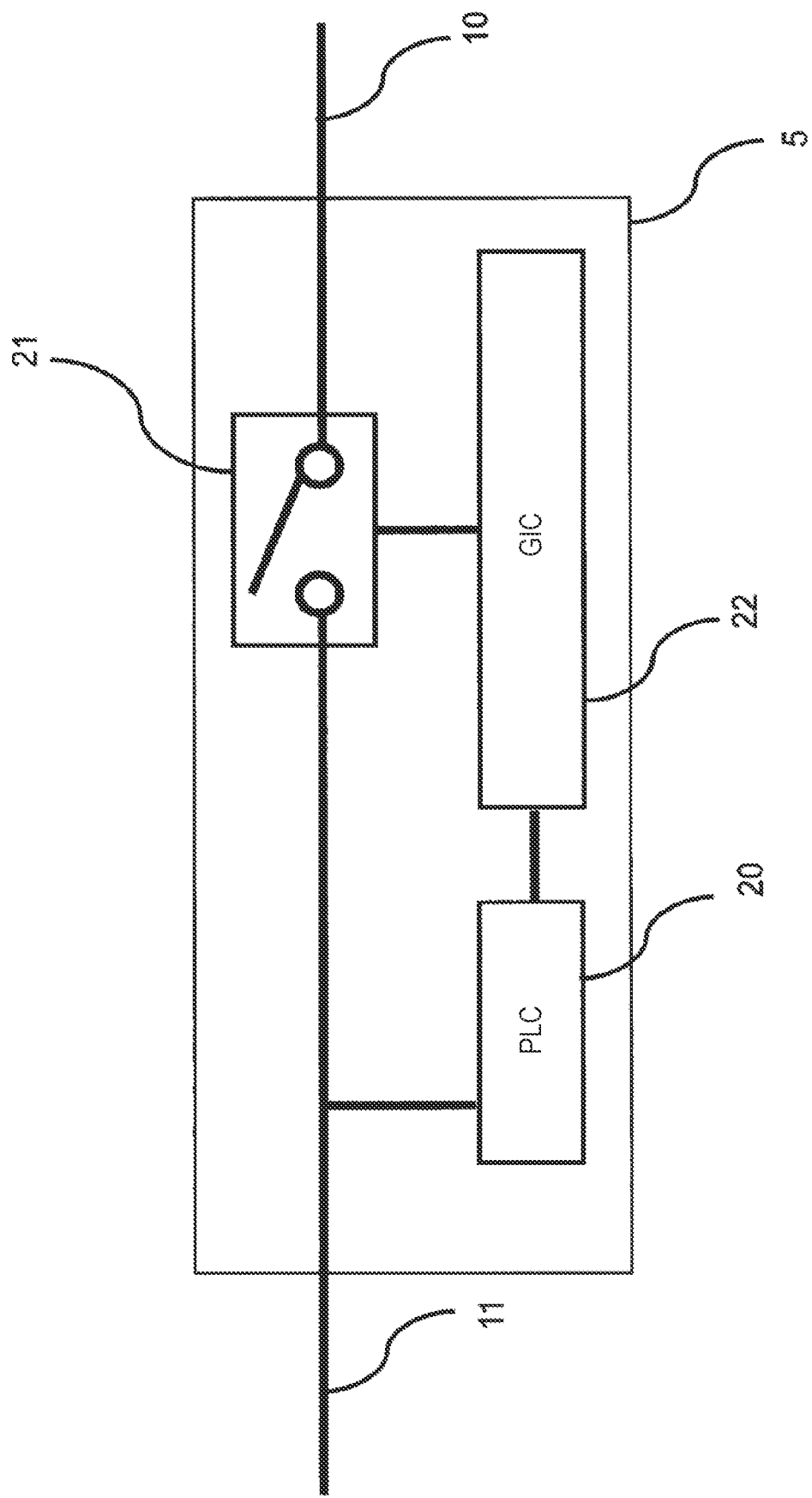
FIG. 3 is a block diagram of a grid interconnection device in a power line communication system.

FIG. 3 illustrates the configuration of the grid interconnection device (GI) 5 according to first embodiment. The grid interconnection device (GI) 5 includes interconnection relay 21, a grid interconnection control unit (GIC) 22, and a power line communication device (PLC) 20. The interconnection relay 21 is a switch circuit that determines whether the power line 10 and the power line 11 are short-circuited. The grid interconnection control unit (GIC) 22 is a circuit for controlling the interconnection relay 21. The power line communication device (PLC) 20 is a device for transmission information acquired from the monitoring device (MD) 7 through power line communication to the grid interconnection control unit (GIC) 22.

The interconnection relay 21 is connected to the power line 10, the grid interconnection control unit (GIC) 22, and the power line 11. The grid interconnection control unit (GIC) 22 is connected to the interconnection relay 21 and the power line communication device (PLC) 20. The power line communication device (PLC) 20 is connected to the grid interconnection control unit (GIC) 22 and the power line 11.

The AC power outputted from the power converter (PC) 4 is inputted to the grid interconnection device (GI) 5 via the power line 10. The grid interconnection device (GI) 5 opens and closes the interconnection relay 21 according to the status of the power generation of the solar photovoltaic power generation system and the grid. The operation of the interconnection relay 21 is controlled by the grid interconnection control unit (GIC) 22. In order to make the operation of the grid interconnection device (GI) 5 more efficient, the power line communication device (PLC) 20 acquires information on the status of the power generation of the solar power generation system and the grid from the monitoring device (MD) 7 by the power line communication, and transmits the information to the grid interconnection control unit (GIC) 22.

Figure 4:
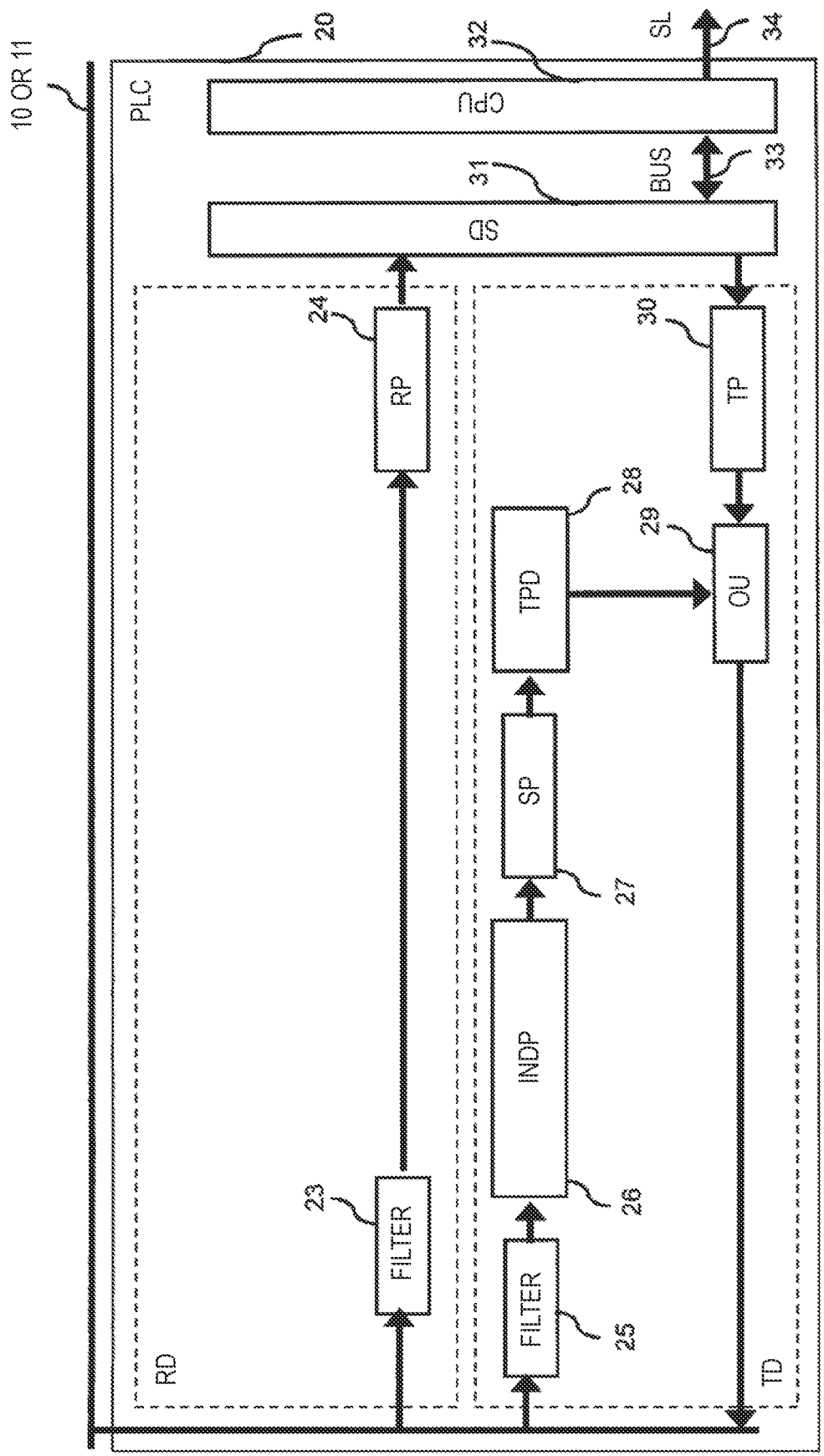
FIG. 4 is a configuration diagram of a power line communication device according to first embodiment.

FIG. 4 shows a configuration example of a power line communication device (PLC) 20 according to first embodiment. The power line communication device (PLC) 20 is connected to another power line communication device (PLC) 20 via a power line 10 or 11. Each power line communication device (PLC) 20 includes filter 23 and 25, a reception processing unit (RP) 24, an inverter noise detection processing unit (INDP) 26, a synchronization processing unit (SP) 27, a transmission position determination unit (TPD) 28, an output unit (OU) 29, a transmission processing unit (TP) 30, a storage device (SD) 31, and a CPU 32.

The filter 23 and 25 are circuits for removing excessive wave components from signals inputted from the power line 10 or 11. The reception processing unit (RP) 24 is a processing circuit for acquiring reception data from a PLC reception signal. The inverter noise detection processing unit (INDP) 26 is a circuit for detecting inverter noise from an input signal. The synchronous processing unit (SP) 27 is a processing unit for synchronizing the waveforms of the detected inverter noises with the system clocks of the power line communication device (PLC) 20. The transmission position determination unit (TPD) 28 is a determination circuit for determining a PLC transmission period. The output unit (OU) 29 is a circuit for outputting the PLC transmission signal to the power line 10 or 11. The transmission processing unit (TP) 30 is a processing unit for generating PLC transmission signals based on transmission data read from the storage device (SD) 31. The storage device (SD) 31 is a device for holding transmission/reception data. A CPU (Central Processing Unit) 32 is a central processing device for controlling the power line communication device (PLC) 20. The bus 33 is an internal bus connecting the storage device (SD) 31 and the CPU 32, and the signal line (SL) 34 is an internal signal line connecting the CPU 32 and the internal circuits.

The filter 23 is connected to the power line 10 or 11 and the reception processing unit (RP) 24. The reception processing unit (RP) 24 is connected to a storage device (SD) 31, and the storage device (SD) 31 is connected to the CPU 32 via a bus 33. Further, the CPU 32 is connected to an inner signal line (SL) 34. The filter 25 is connected to the power line 10 or 11 and the inverter noise detection processing unit (INDP) 26. The inverter noise detection processing unit (INDP) 26 is connected to the synchronization processing unit (SP) 27, and the synchronization processing unit (SP) 27 is connected to the transmission position determination unit (TPD) 28. The transmission position determination unit (TPD) 28 is connected to the output unit (OU) 29. Further, the output unit (OU) 29 is connected to the power line 10 or 11 and the transmission processing unit (TP) 30. The transmission processing unit (TP) 30 is connected to the storage device (SD) 31.

Transmission Operations Related to First Embodiment

The operation of transmission device (TD) will be described with reference to FIG. 4. By filter 25, in voltage waveforms on the power lines 10 or 11, frequency components other than the inverter noise frequency determined by the operating frequency of the DC/AC inverter (DC/AC INV) 18 are removed. The inverter noise detection processing unit (INDP) 26 determines the presence or absence of inverter noise. For example, the presence or absence of inverter noise corresponding to the operating frequency 20 KHz of the DC/AC inverter (DC/AC INV) 18 is determined. When it is determined that the inverter noise is present, the synchronization processing unit (SP) 27 synchronizes the inverter noise waveforms with the system clock of the power line communication device (PLC) 20. Based on the synchronized inverter noise waveform, the transmission position determination unit (TPD) 28 determines that the PLC transmission period is a period in which the transmission signal amplitude of the transmission processing unit (TP) 30 exceeds a predetermined value from the inverter noise voltage amplitude. The output unit (OU) 29 outputs the PLC transmission signal output from the transmission processing unit (TP) 30 to the power line 10 or 11 only during the PLC transmission period based on the determination result of the transmission position determination unit (TPD) 28. The transmission processing unit (TP) 30 generates a PLC transmission signal of the PLC transmission data read from the storage device (SD) 31, and outputs the PLC transmission signal to the output unit (OU) 29.

Reception Operation Related to First Embodiment

In the same way, the operation of the reception device (RD) will be described with reference to FIG. 4. The reception device (RD) removes frequency components other than the PLC transmission signal in the filter 23 from the PLC reception signal inputted from the power line 10 or 11. The reception processing unit (RP) 24 acquires the PLC reception data from the PLC reception signal, and writes the PLC reception data to the storage device (SD) 31.

(Example of Operation Waveform of First Embodiment)

Figure 5:
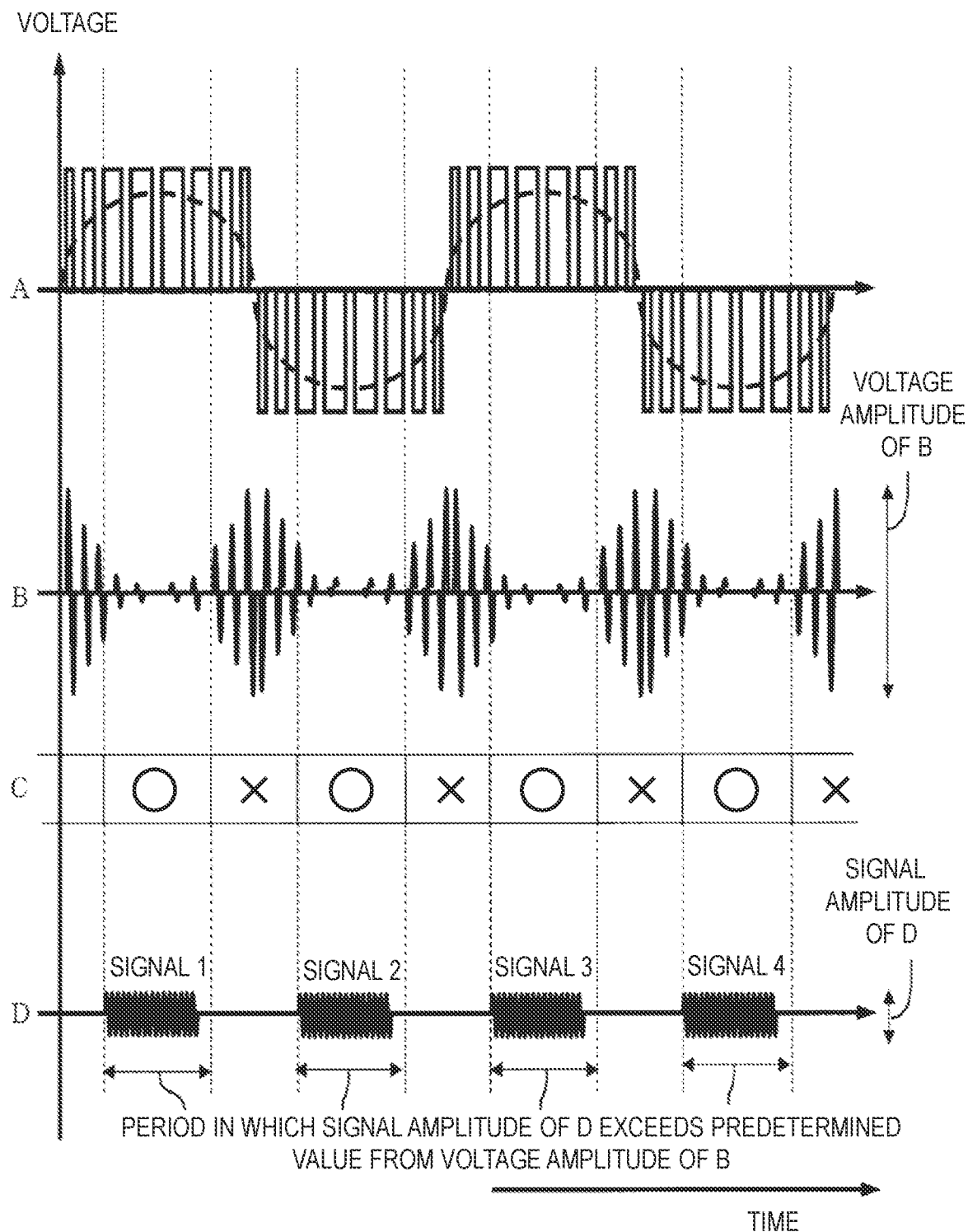
FIG. 5 is a diagram for explaining operation waveforms of the power line communication device according to first embodiment.

FIG. 5 shows an example of an operation waveform of the power line communication device according to first embodiment. The A of FIG. 5 shows waveforms of outputs of the DC/AC inverters (DC/AC INV) 18. The B of FIG. 5 shows an inverter noise waveform superimposed on the waveform of the A of FIG. 5 by the operation of the DC/AC inverter (DC/AC INV) 18. The C of FIG. 5 shows a logical output result of the transmission position determination unit (TPD) 28. The D of FIG. 5 shows the waveforms of the PLC transmitted on power line 10 or 11 from the transmission device (TD). As shown in the A of FIG. 5, the DC/AC inverter (DC/AC INV) 18 output AC voltages in rectangular waves by PWM (Pulse Width Modulation). The inverter noise is generated in synchronization with the rectangular wave, and the voltage amplitude of the inverter noise shown in the B of FIG. 5 is proportional to the magnitude of the temporal change rate of the AC voltage value to be output. Since the temporal change rate becomes maximum when the absolute value of the AC voltage value to be output is smallest, the voltage amplitude of the inverter noise becomes maximum, and conversely, when the absolute value of the AC voltage value is maximum, the voltage amplitude of the inverter noise becomes minimum. As shown in the C of FIG. 5, the transmission position determination unit (TPD) 28 determines a period in which the amplitude of the PLC transmission signal shown in the D of FIG. 5 exceeds a predetermined value from the voltage amplitude of the inverter noise shown in the B of FIG. 5 as a PLC transmission period, and determines other periods as a PLC transmission impossible period. (○ means output enable and × means output disable in the C of FIG. 5) As shown in the D of FIG. 5, the PLC transmission signal is output from the output unit (OU) 29 to the power line 10 or 11 only during the PLC transmission period.

Effect of First Embodiment

The amplitude of the PLC transmission signal output to the power line 10 or 11 during the PLC transmission is always larger than the predetermined amplitude of the inverter noise signal voltage generated in the power line 10 or 11. Since the PLC transmission signal is not logically inverted even when the inverter noise is superimposed on the PLC transmission signal, the influence of the inverter noise is reduced and the communication characteristics are improved.

Modified Example of First Embodiment

Figure 6:
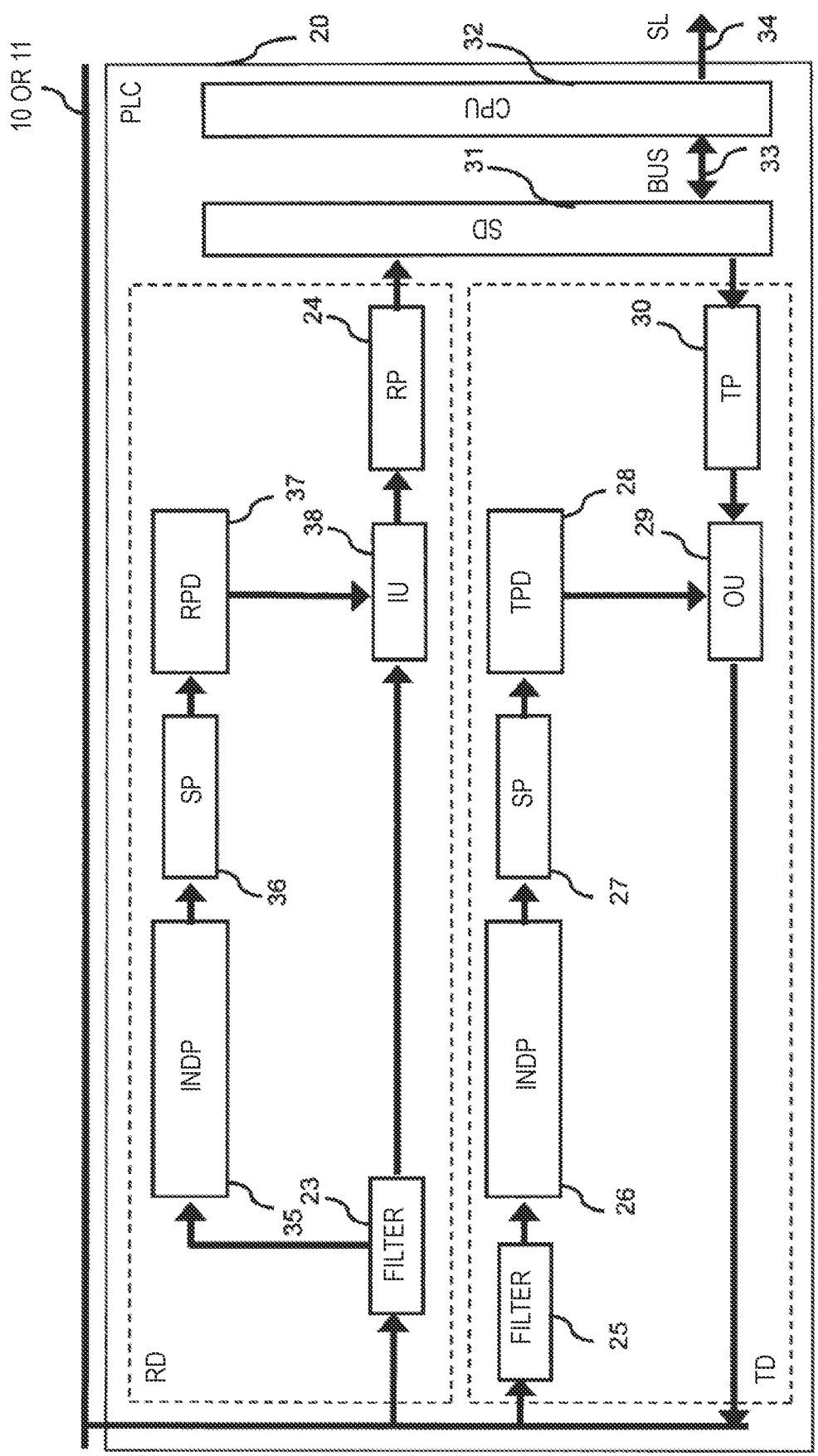
FIG. 6 is a block diagram of a power line communication device according to the modified example of first embodiment.

FIG. 6 shows an exemplary configuration of the power line communication device (PLC) 20 according to the modified example of first embodiment. In this modified example, in addition to the configuration of FIG. 4, the reception device (RD) further includes an inverter noise detection processing unit (INDP) 35, a synchronization processing unit (SP) 36, a reception position determination unit (RPD) 37, and an input unit (IU) 38.

The inverter noise detection processing unit (INDP) 35 is a circuit for detecting inverter noise. The synchronization processing unit (SP) 36 is a processing circuit for synchronizing with the waveform of the inverter noise detected by the inverter noise detection processing unit (INDP) 35. The reception position determination unit (RPD) 37 is a determination circuit for determining a PLC reception period. The input unit (IU) 38 is a circuit for inputting a PLC reception signal from the power line 10 or 11. The operation of each circuit will be described later.

The filter 23 is connected to an inverter noise detection processing unit (INDP) 35 and an input unit (IU) 38. The inverter noise detection processing unit (INDP) 35 is connected to the synchronization processing unit (SP) 36. The synchronization processing unit (SP) 36 is connected to the reception position determination unit (RPD) 37. The reception position determination unit (RPD) 37 is connected to the input unit (IU) 38. The input unit (IU) 38 is connected to the reception processing unit (RP) 24.

Operation of Modified Example of First Embodiment

Since the operation of transmission device (TD) is the same of first embodiment, the explanation is omitted.

The operation of the reception device (RD) will be described with reference to FIG. 6. The filter 23 removes frequency components other than the inverter noise frequency determined from the operating frequency of the DC/AC inverter (DC/AC INV) 18 from the PLC reception signal inputted from the power line 10 or 11. The inverter noise detection processing unit (INDP) 35 detects the inverter noise in the PLC received signal passing through the filter 23, and determines whether or not the PLC received signal has inverter noise. For example, the presence or absence of inverter noise corresponding to the operating frequency 20 KHz of the inverter (DC/AC INV) 18 is determined. The synchronization processing unit (SP) 36 synchronizes the waveforms of the inverter noise with the system clock of the power line communication device (PLC) 20 when it is determined that the inverter noise is present. The reception position determination unit (RPD) 37 determines the PLC reception period based on the determination criterion of the transmission position determination unit (TPD) 28. For example, similarly to the transmission position determination unit (TPD) 28, a period in which reception signal amplitude exceeds a predetermined value from the inverter noise voltage amplitude is determined as the PLC reception period. Based on the result of the reception position determination unit (RPD) 37, the input unit (IU) 38 of the transmission position determination unit (TPD) 28 inputs the PLC reception signal that has passed through the filter 23 to the reception processing unit (RP) 24 only during the PLC reception period. The reception processing unit (RP) 24 writes the PLC reception data acquired from the PLC reception signals to the storage device (SD) 31.

Effect of Modified Example of First Embodiment

In the modified example of first embodiment, the PLC reception signal is inputted to the reception processing unit (RP) 24 only during the PLC reception period based on the determination result of the reception position determination unit (RPD) 37. Since the PLC reception signal is not input in a period other than the PLC reception period, the reception processing unit (RP) 24 can stop the operation. As a result, the power consumption of the reception processing unit (RP) 24 can be reduced.

Second Embodiment

Figure 7:
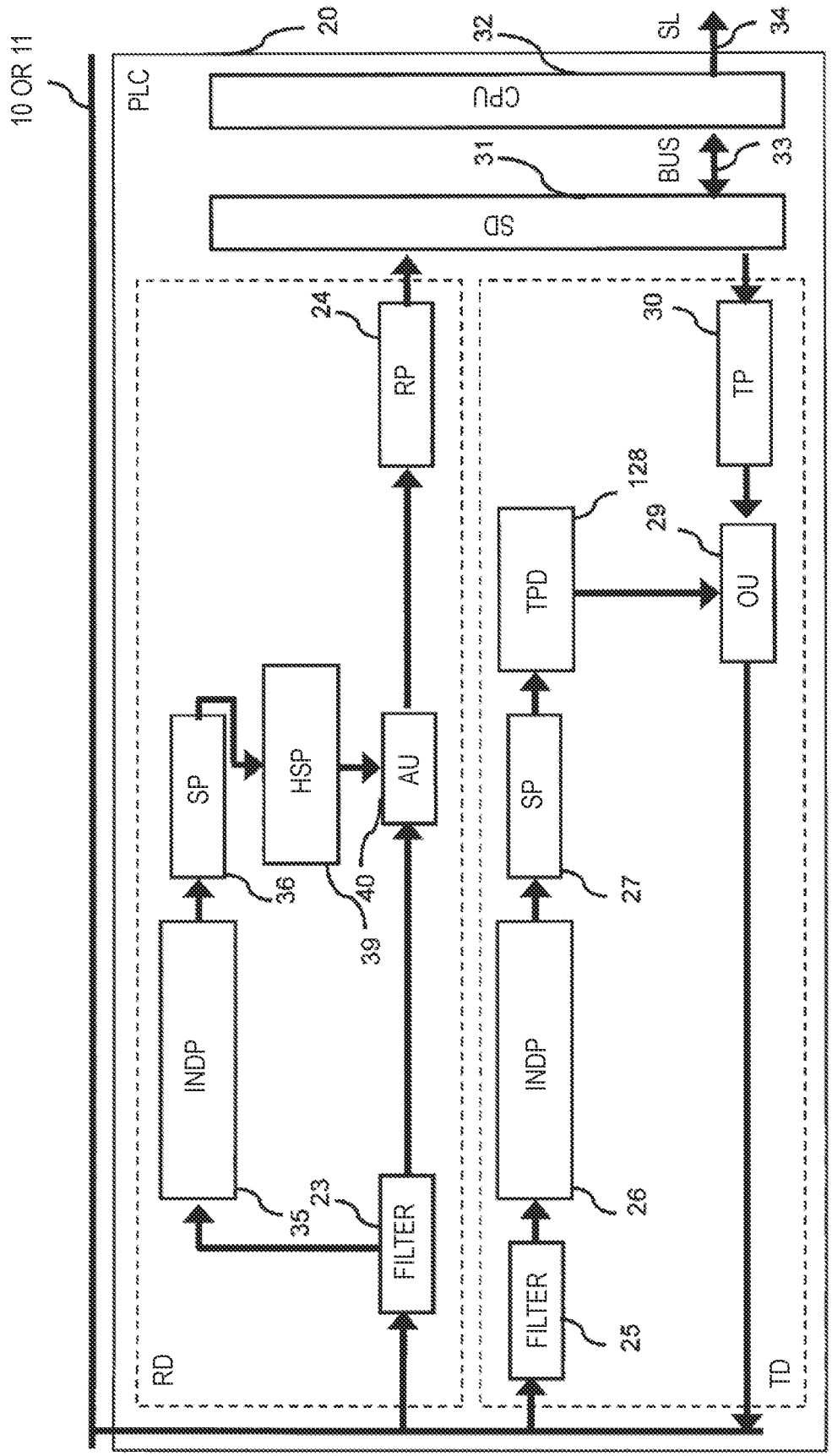
FIG. 7 is a configuration diagram of a power line communication device according to second embodiment.

FIG. 7 shows an exemplary configuration of a power line communication device (PLC) 20 according to second embodiment. In the configuration of second embodiment, the transmission position determination unit of the transmission device (TD) is replaced with the transmission position determination unit (TPD) 128 as compared with the modified example of first embodiment. The reception device (RD) further includes a half-wavelength shift processing unit (HSP) 39 and an addition unit (AU) 40. Since the configurations other than the transmission position determination unit (TPD) 128 of the transmission device (TD), the half-wavelength shift processing unit (HSP) 39 of the reception device (RD), and the addition unit (AU) 40 are substantially the same as those of the modified example of first embodiment, their explanations are omitted.

The transmission position determination unit (TPD) 128 is a determination circuit for determining the PLC transmission period, similarly to the transmission position determination unit (TPD) 28 of the modified example of embodiment. However, unlike the transmission position determination unit (TPD) 28, the transmission position determination unit (TPD) 128 is a circuit that determines a period corresponding to the half-wavelength of the inverter noise as a PLC communication execution period, and determines a period immediately after that corresponding to the half-wavelength of the inverter noise as a PLC communication standby period. The half-wavelength shift processing unit (HSP) 39 is a circuit for generating a half-wavelength shift signal in which the phase corresponding to the half-wavelength of the inverter noise is shifted. The addition unit 40 adds the half-wavelength shifted signal and the PLC-received signal that has passed through the filter 23.

In the present embodiment, the synchronization processing unit (SP) 36 connected to the inverter noise detection processing unit (INDP) 35 of the reception device (RD) is connected to the half-wavelength shift processing unit (HSP) 39. The half-wavelength shift processing unit (HSP) 39 is further connected to the addition unit (AU) 40. The addition unit (AU) 40 is connected to the filter 23 and the reception processing unit (RP) 24.

Operation of Second Embodiment

The operation of the transmission device (TD) is explained with reference to FIG. 7. By filter 5, voltage waveforms on the power lines 10 or 11 are removed frequency components other than the inverter noise frequency determined by the operating frequency of the DC/AC inverter (DC/AC INV) 18. The inverter noise detection processing unit (INDP) 26 determines the presence or absence of inverter noise. For example, the presence or absence of inverter noise corresponding to the operating frequency 20 KHz of the DC/AC inverter (DC/AC INV) 18 is determined. When it is determined that the inverter noise is present, the synchronization processing unit (SP) 27 synchronizes the inverter noise waveforms with the system clock of the power line communication device (PLC) 20. Based on the synchronized inverter noise waveform, the transmission position determination unit (TPD) 128 determines that the period corresponding to the half-wavelength of the inverter noise is the PLC communication execution period, and determines that the period corresponding to the half-wavelength of the inverter noise immediately following the PLC communication execution period is the PLC communication standby period. The output unit (OU) 29 outputs the PLC transmission signal output from the transmission processing unit (TP) 30 to the power line 10 or 11 during the PLC communication execution period based on the determination result of the transmission position determination unit (TPD) 128.

Similarly, the operation of the reception device (RD) will be described with reference to FIG. 7. When the inverter noise detection processing unit (INDP) 35 determines that there is inverter noise in the PLC reception signal, the half-wavelength shift processing unit (HSP) 39 generates a half-wavelength shift signal in which the phase corresponding to the half-wavelength of the inverter noise is shifted with respect to the PLC reception signal. The addition unit (AU) 40 performs a process of adding the half-wavelength shifted signal and the original PLC-received signal that has passed through the filter 23. In the reception device (RD), the reception processing unit (RP) 24 acquires the PLC-received data from the output signal of the addition unit (AU) 40, and writes the PLC-received data to the storage device (SD) 31.

Figure 8:
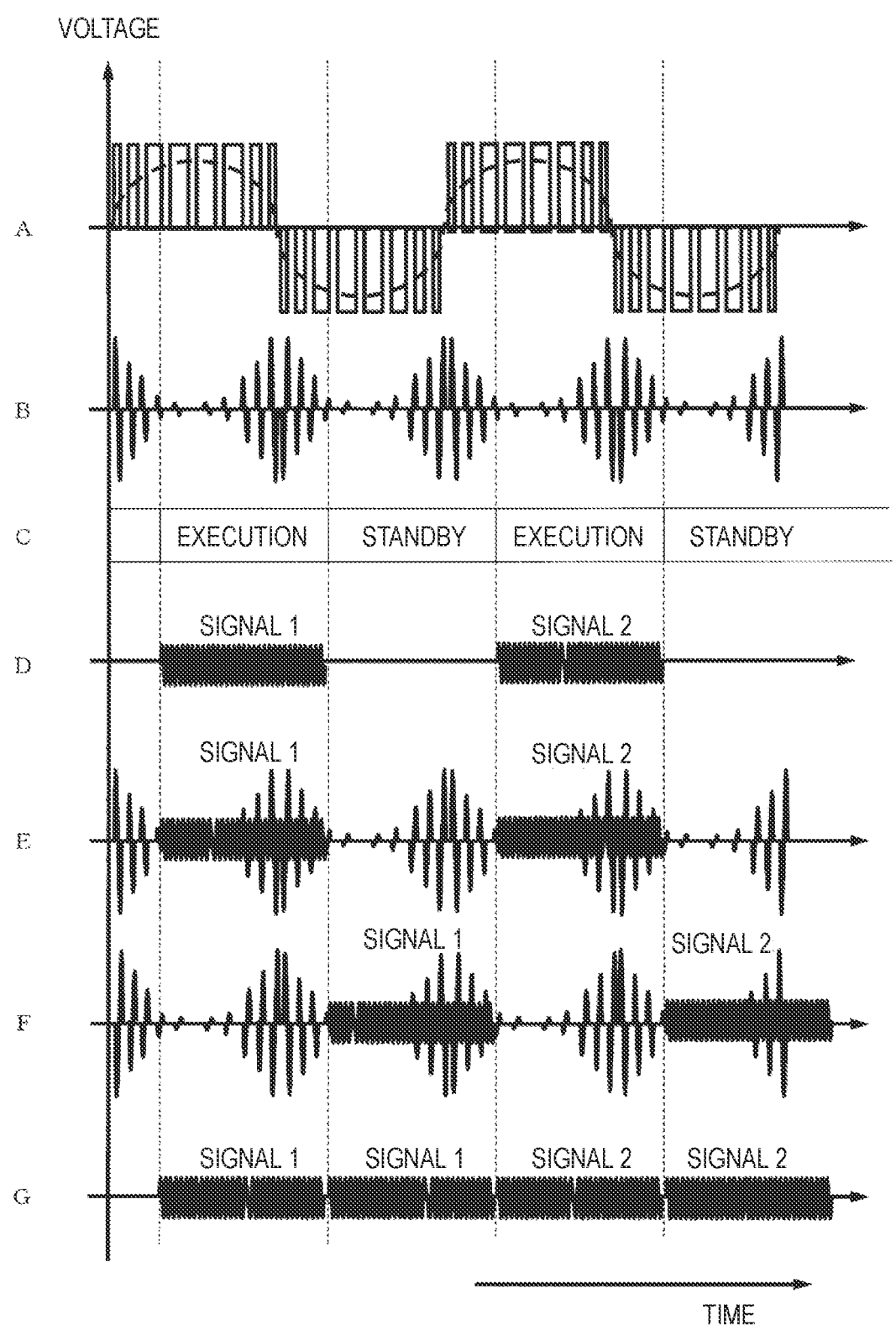
FIG. 8 is a diagram for explaining operation waveforms of the power line communication device according to second embodiment.

FIG. 8 shows an example of a waveform of a power line communication operation according to second embodiment. The A of FIG. 8 shows an output waveform of the DC/AC inverter (DC/AC INV) 18. The B of FIG. 8 shows an inverter noise waveform generated by the operation of the DC/AC inverter (DC/AC INV) 18 in the power line 10 or 11. The C of FIG. 8 shows a logical output result of the transmission position determination unit (TPD) 128. The D of FIG. 8 shows an output waveform of the transmission processing unit (TP) 30. The E of FIG. 8 shows the waveforms of the PLC reception signals inputted to the reception device (RD) via power line 10 or 11. The F of FIG. 8 shows an output waveform of the half-wavelength shift processing unit (HSP) 39. The G of FIG. 8 shows an output waveform of the addition unit (AU) 40. As shown in the C of FIG. 8, the transmission position determination unit (TPD) 128 sequentially and alternately determines the period corresponding to the half-wavelength of the inverter noise as the PLC communication execution period PLC and communication standby period. As shown in the D of FIG. 8, the PLC transmission signal is outputted from the transmission processing unit (TP) 30 during the PLC communication execution period. As shown in the E of FIG. 8, the PLC reception signal waveform inputted to the reception device (RD) via the power line 10 or 11 is a waveform in which the inverter noise shown in the B of FIG. 8 is superimposed on the output waveform of the transmission processing unit (TP) 30 shown in the D of FIG. 8. As shown in the F of FIG. 8, the output waveform of the half-wavelength shift processing unit (HSP) 39 is a waveform obtained by shifting the phase of the PLC reception signal waveform shown in the E of FIG. 8 corresponding to the half-wavelength of the inverter noise. In the output waveform of the addition unit (AU) 40, as shown in the G of FIG. 8, the inverter noise waveform shown in the E of FIG. 8 and the inverter noise waveform shown in the F of FIG. 8 are cancelled.

Effects of Second Embodiment

The inverter noise component included in the output wavelength of the half-wavelength shift processing unit (HSP) 39 of the PLC reception signal is inversely related to the inverted noise component that is superimposed on the original PLC reception signal. Since the inverter noise component is canceled by adding the output waveform of the half-wavelength shift processing unit (HSP) 39 and the original PLC reception signal waveform, the influence of the inverter noise can be reduced.

Further, since the cycle of the inverter noise is the same as the cycle of the commercial power supply, it is possible to reduce the influence of periodic noise other than the inverter noise generated in the cycle of the commercial power supply.

First Modified Example of Second Embodiment

Figure 9:
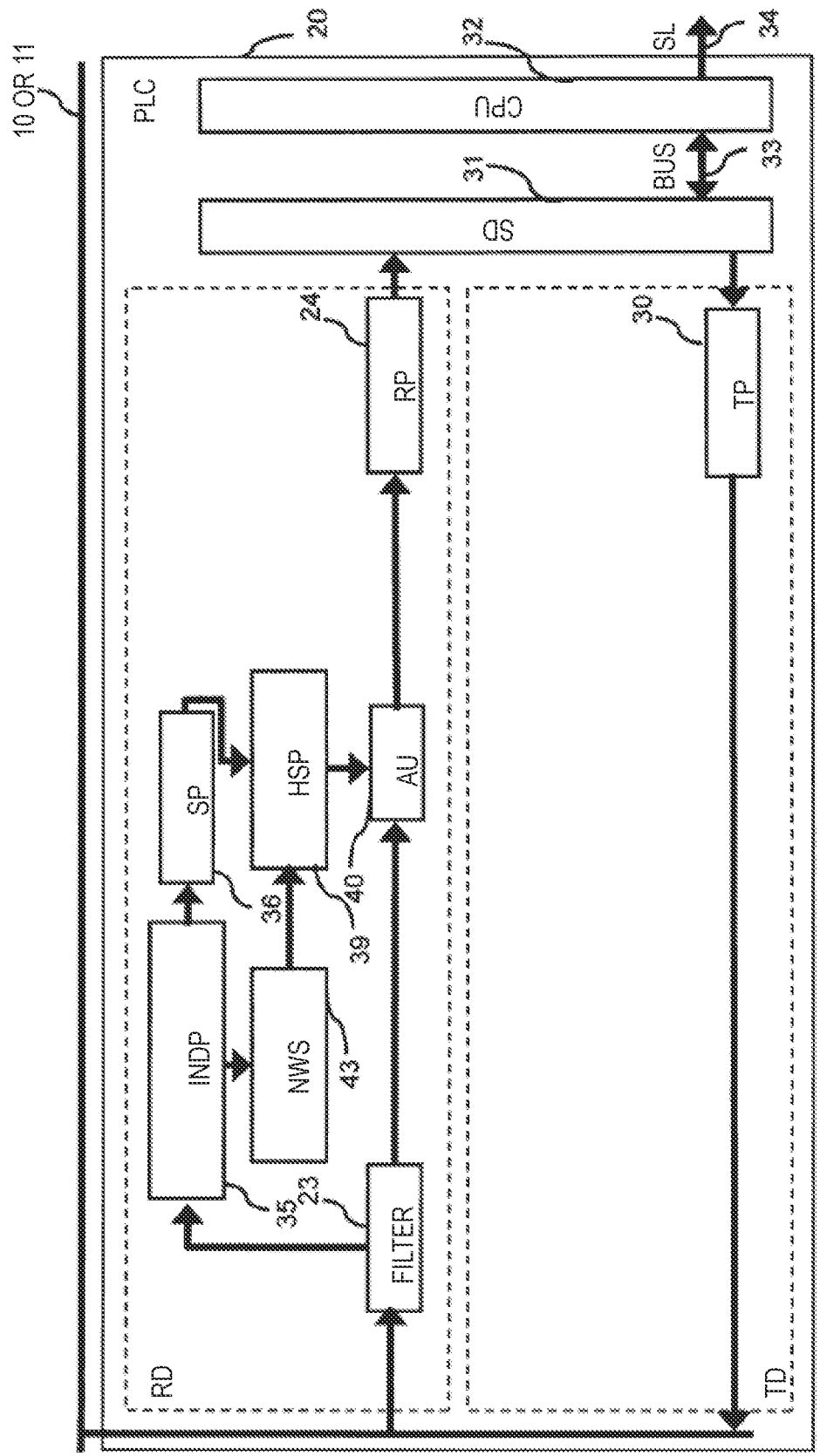
FIG. 9 is a block diagram of a power line communication device according to the first modified example of second embodiment.

FIG. 9 shows the configuration of the first modified example of second embodiment. Compared to second embodiment, the reception device (RD) has a configuration in which a noise waveform storage device (NWS) 43 is added. The transmission device (TD) includes only the transmission processing unit (TP) 30. Since the circuits other than the noise waveform storage device (NWS) 43 are the same as those of second embodiment, their explanations are omitted.

The noise waveform storage device (NWS) 43 of the reception device (RD) is a device for holding and storing a waveform having only an inverter noise frequency component from which the PLC-signal frequency component is removed, out of the inverter noise detected by the inverter noise detection processing unit (INDP) 35.

The inverter noise detection processing unit (INDP) 35 of the reception device (RD) is connected to the synchronization processing unit (SP) 36 and the noise waveform storage device (NWS) 43. A noise waveform storage device (NWS) 43 is connected to the half-wavelength shift processing unit (HSP) 39. The half-wavelength shift processing unit (HSP) 39 is connected to the addition unit (AU) 40.

Operation of First Modified Example of Second Embodiment

In the first modified example of second embodiment, the noise waveform storage device (NWS) 43 of the reception device (RD) extracts and stores a waveform containing a large amount of inverter noise obtained by removing PLC-signal frequency components from the inverter noise waveform detected by the inverter noise detection processing unit (INDP) 35. Alternatively, the noise waveform storage device (NWS) 43 stores a waveform including a large amount of inverter noise of the power line 10 or 11 acquired when the PLC communication is not performed. The half-wavelength shift processing unit (HSP) 39 generates a half-wavelength shift signal having a phase shift corresponding to the half-wavelength of the inverter noise with respect to the waveform including a large amount of inverter noise stored in the noise waveform storage device (NWS) 43. The addition unit (AU) 40 adds the half-wavelength shift signal and the original PLC reception signal inputted through the filter 23. Since the output waveform of the half-wavelength shift processing unit (HSP) 39 is a waveform including a large amount of inverter noise and does not include any PLC reception data, the addition processing of the addition unit (AU) 40 does not interfere with the PLC communication data included in the original PLC transmission signal. The reception processing unit (RP) 24 acquires the PLC reception data from the output signal of the addition unit (AU) 40 from which the inverter noise has been cancelled, and writes the PLC reception data to the storage device (SD) 31.

In the operation of the transmission device (TD), the transmission processing unit (TP) 30 outputs the PLC transmission signal to the power line 10 or 11 at any time. The first modified example does not require PLC standby periods based on synchronized inverter noise waveforms, as second embodiment. This is because the reception device (RD) of the first modified example can cancel the inverter noise generated in the power line 10 or 11 over the entire cycle as described above, and can execute the PLC communication operation at any time since the inverter noise does not interfere with the PLC transmit signals.

(Example of Operation Waveform of Modified Example of Second Embodiment)

Figure 10:
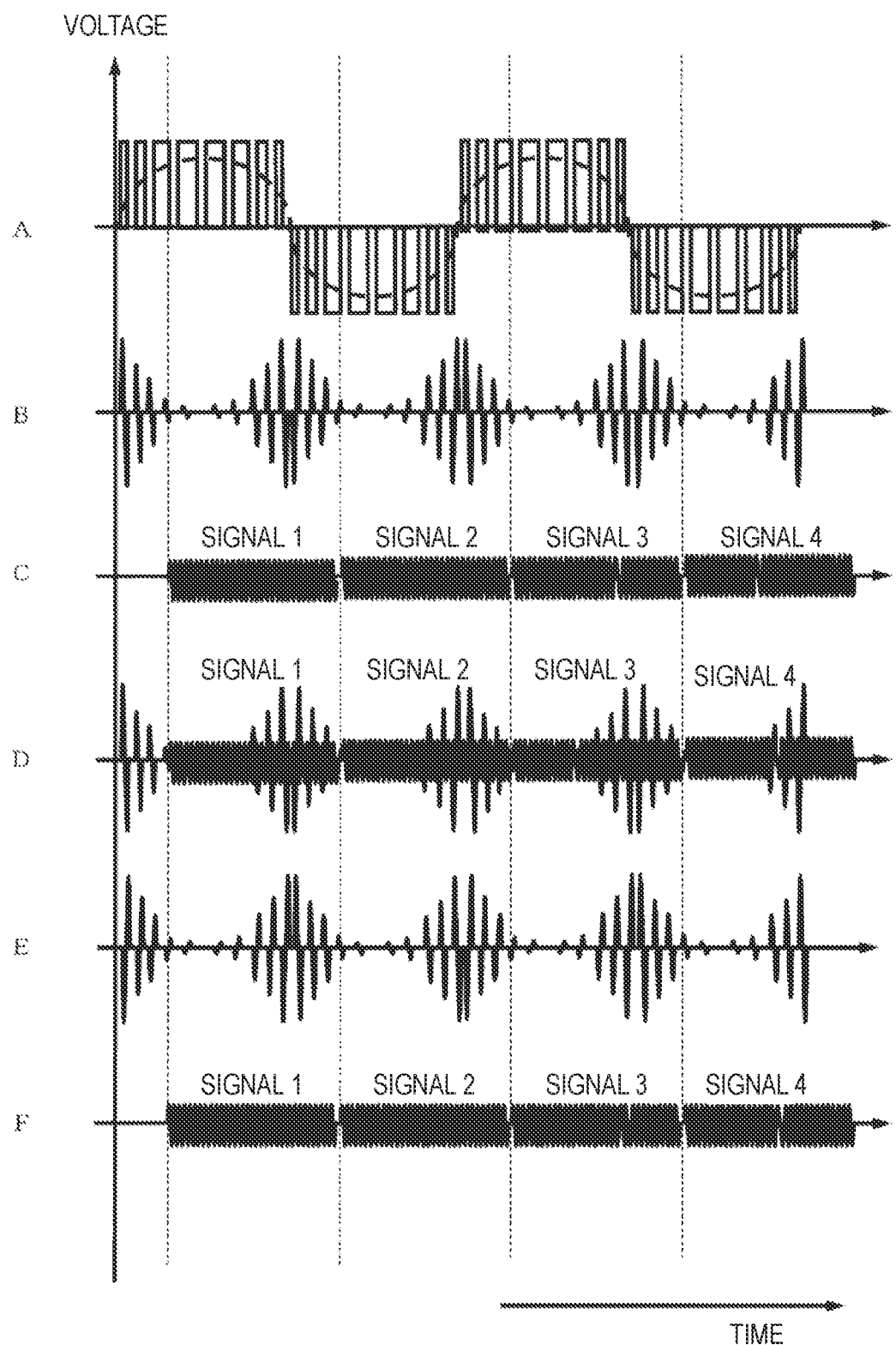
FIG. 10 is a diagram for explaining operation waveforms of the power line communication device according to the first modified example of second embodiment.

FIG. 10 shows an example of a waveform of a power line communication operation according to first modified example of second embodiment. The A of FIG. 10 shows an output waveform of the DC/AC inverter (DC/AC INV) 18. The B of FIG. 10 shows an inverter noise waveform generated in the power line 10 or 11 by the operation of the DC/AC inverter (DC/AC INV) 18. The C of FIG. 10 shows an output waveform of the transmission processing unit (TP) 30. The D of FIG. 10 shows the waveforms of the PLC reception signals inputted to the reception device (RD). The E of FIG. 10 shows an output waveform of the half-wavelength shift processing unit (HSP) 39. The F of FIG. 10 shows an output waveform of the addition unit (AU) 40. As shown in the C of FIG. 10, the PLC transmission signals 1 to 4 are output from the transmission processing unit (TP) 30 at arbitrary times over the entire cycle of the inverter noise. As shown in the D of FIG. 10, the PLC reception signal waveform inputted to the reception device (RD) via the power line 10 or 11 is a waveform in which the inverter noise shown in the B of FIG. 10 is superimposed on the output waveform of the transmission processing unit (TP) 30 shown in the C of FIG. 10. As shown in the E of FIG. 10, the signal added to the PLC reception signal is a waveform including a large amount of inverter noise. As shown in the F of FIG. 10, the output signal of the addition unit (AU) 40 has a waveform of only the PLC transmission signals 1 to 4 in which only the inverter noise is canceled.

The first modified example can eliminate second embodiment PLC communication standby time. This is because the inverter noise generated in the power line 10 or 11 is canceled over the entire cycle, and further, since the half-wavelength shift signal does not interfere with the PLC transmission signal, the PLC communication operation can be performed at an arbitrary time. As a result, second embodiment PLC communication standby period can be eliminated, and the PLC communication can be performed in both the PLC communication executing time and the PLC communication standby period, so that the communication efficiencies can be doubled. Since the transmission device (TD) does not need to include the filter 25, the inverter noise detection processing unit (INDP) 26, the synchronization processing unit (SP) 27, and the transmission position determination unit (TPD) 128 as compared with second embodiment, there are effects of reducing the circuit area and power consumption. Furthermore, since the noise waveform storage device (NWS) 43 stores and retains a waveform containing a large amount of inverter noise, the half-wavelength shift processing unit (HSP) 39 can read the waveform again after acquiring and storing the waveform by an initialization operation or the like, so that it is unnecessary to acquire a waveform containing a large amount of inverter noise each time, and the operation of the reception device (RD) can be made high-speed and highly efficient.

Second Modified Example of Second Embodiment

Figure 11:
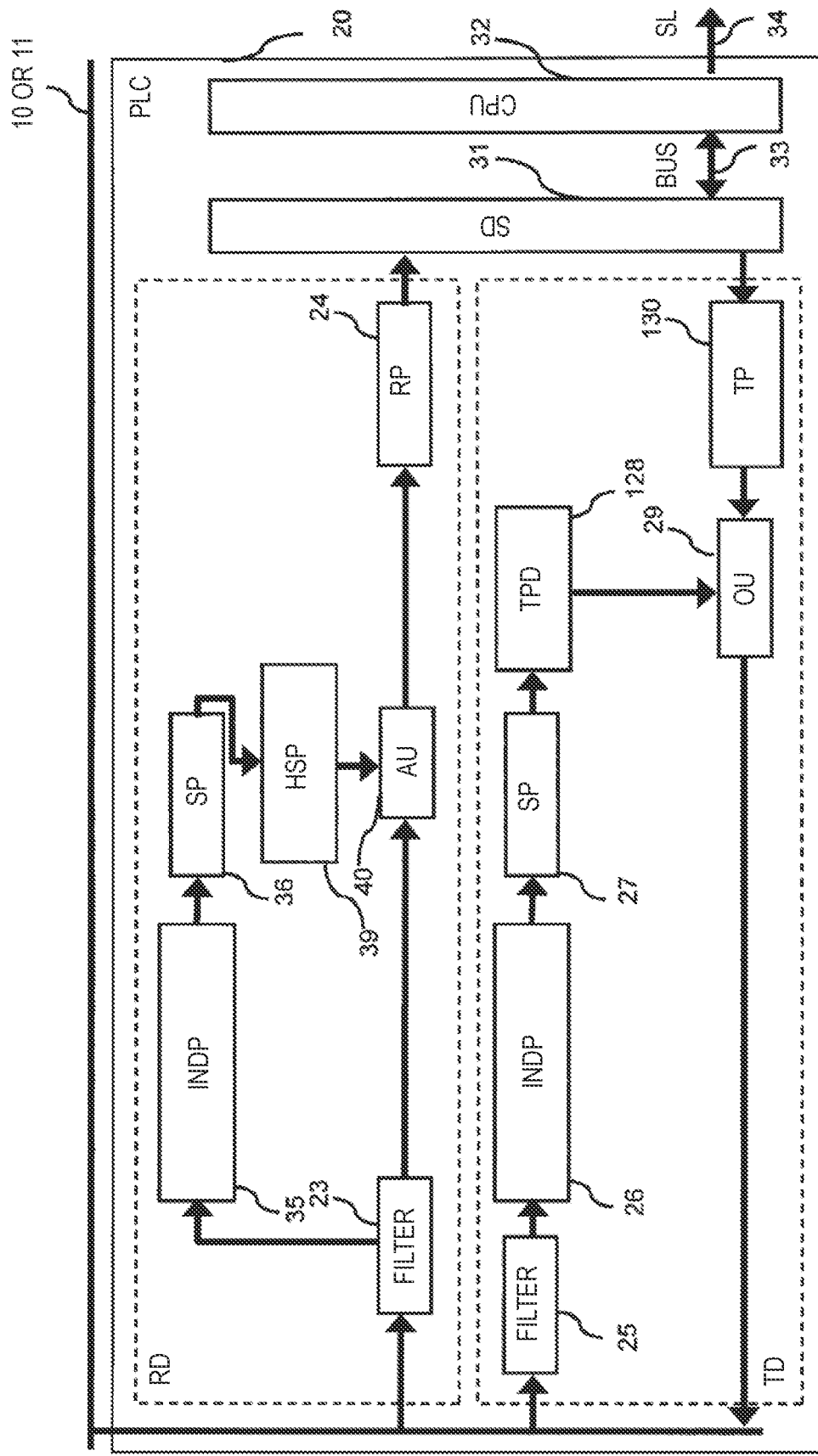
FIG. 11 is a block diagram of a power line communication device according to the second modified example of second embodiment.

FIG. 11 shows a configuration of a power line communication device (PLC) 20 according to the second modified example of second embodiment. In the second modified example of second embodiment, the transmission device (TD) includes a transmission processing unit (TP) 130 instead of the transmission processing unit (TP) 30, as compared with second embodiment. Since configurations other than the transmission processing unit (TP) 30 are the same as those of second embodiment, their explanations are omitted.

The transmission processing unit (TP) 130 of the transmission device (TD), like the transmission processing unit (TP) 30, is a processing circuit for generating the PLC transmission signal based on the transmission data, unlike second embodiment, is a processing circuit for outputting the same PLC transmission signal once every two times in a continuous PLC communication implementation period and PLC communication standby period.

The operation of the device is controlled so that, when it is determined that inverter noise is present in the power line 10 or 11, the transmission processing unit (TP) 130 outputs the same PLC transmission signal from the output unit (OU) 29 one by one in the consecutive PLC communication executing period and PLC communication standby period based on the determination result obtained in the transmission position determination unit (TPD) 128.

Figure 12:
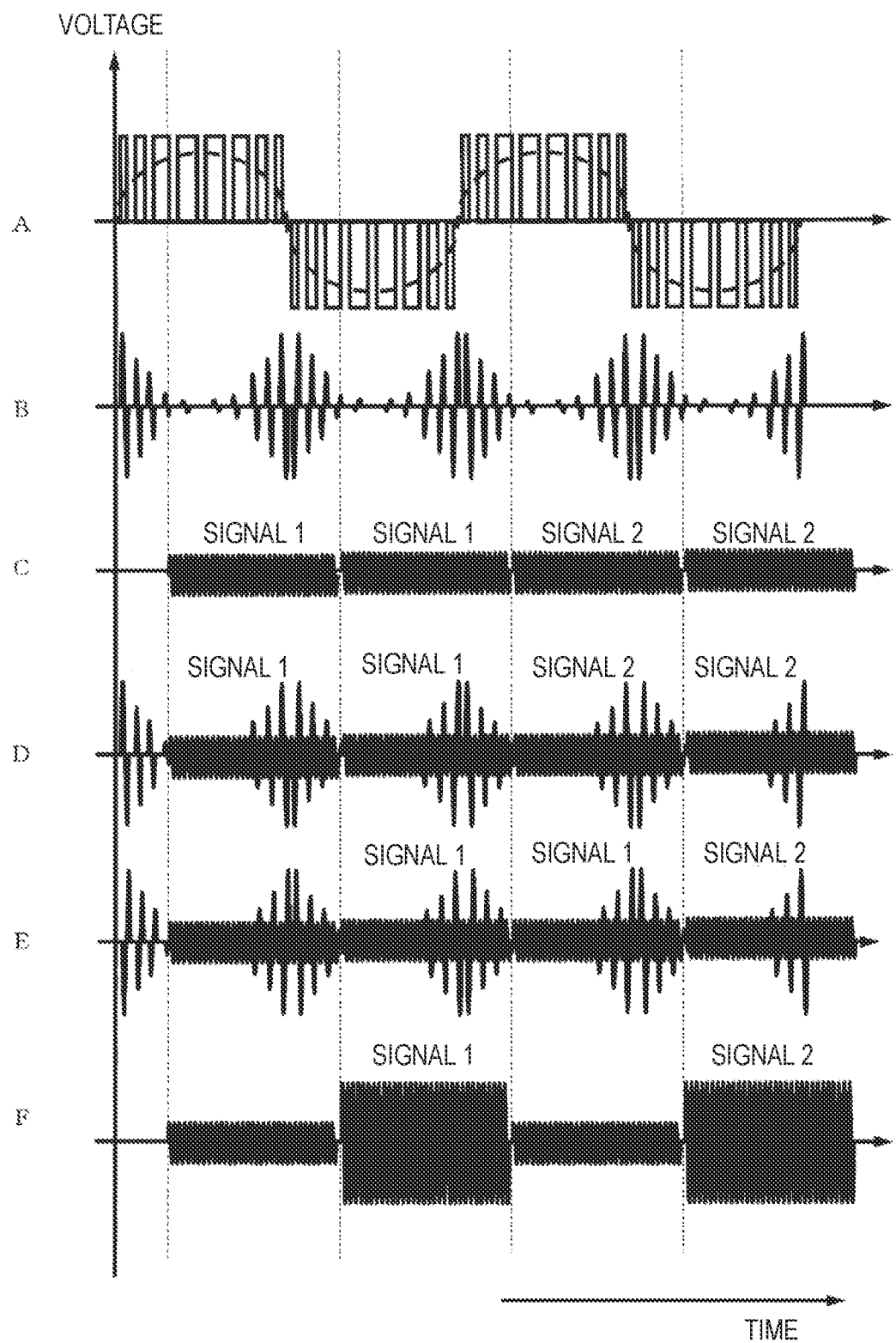
FIG. 12 is a diagram for explaining operation waveforms of the power line communication device according to the second modified example of second embodiment.

FIG. 12 shows exemplary waveforms of the power line communication operation according to the second modified example of second embodiment. The A of FIG. 12 shows an output waveform of the DC/AC inverter (DC/AC INV) 18, the B of FIG. 12 shows an inverter noise waveform generated in the power line 10 or 11 by the operation of the DC/AC inverter (DC/AC INV) 18, the C of FIG. 12 shows an output waveform of the transmission processing unit (TP) 130, the D of FIG. 12 shows a PLC reception signal waveform inputted to the reception device (RD), the E of FIG. 12 shows an output waveform of the half-wavelength shifting processing unit (HSP) 39, and the F of FIG. 12 shows an output waveform of the addition unit (AU) 40.

In addition to the effects of second embodiment, the PLC communication implementation period and PLC communication standby period, which are consecutive in sync with the cycle of inverters noise, produce the same PLC signal wave. As a result, the PLC reception signal, which is added to the same PLC reception signal at the PLC reception device (RD), is approximately double the magnitude of the amplitude because the PLC reception signal, which is output from the addition (AU) 40, is stronger. Therefore, compared with second embodiment, the effect of inverter noise can be further reduced.

As an effect of improving the noise tolerance, in addition to the effect of canceling the periodic noise including the inverter noise by the DC/AC inverter (DC/AC INV) 18 in second embodiment, the PLC communication signal is emphasized by the function of outputting the same PLC transmission signal as the PLC communication period also in the PLC communication standby period of the transmission processing unit (TP) 130, and therefore, there is a further effect of improving the communication quality.

Third Modified Example of Second Embodiment

Figure 13:
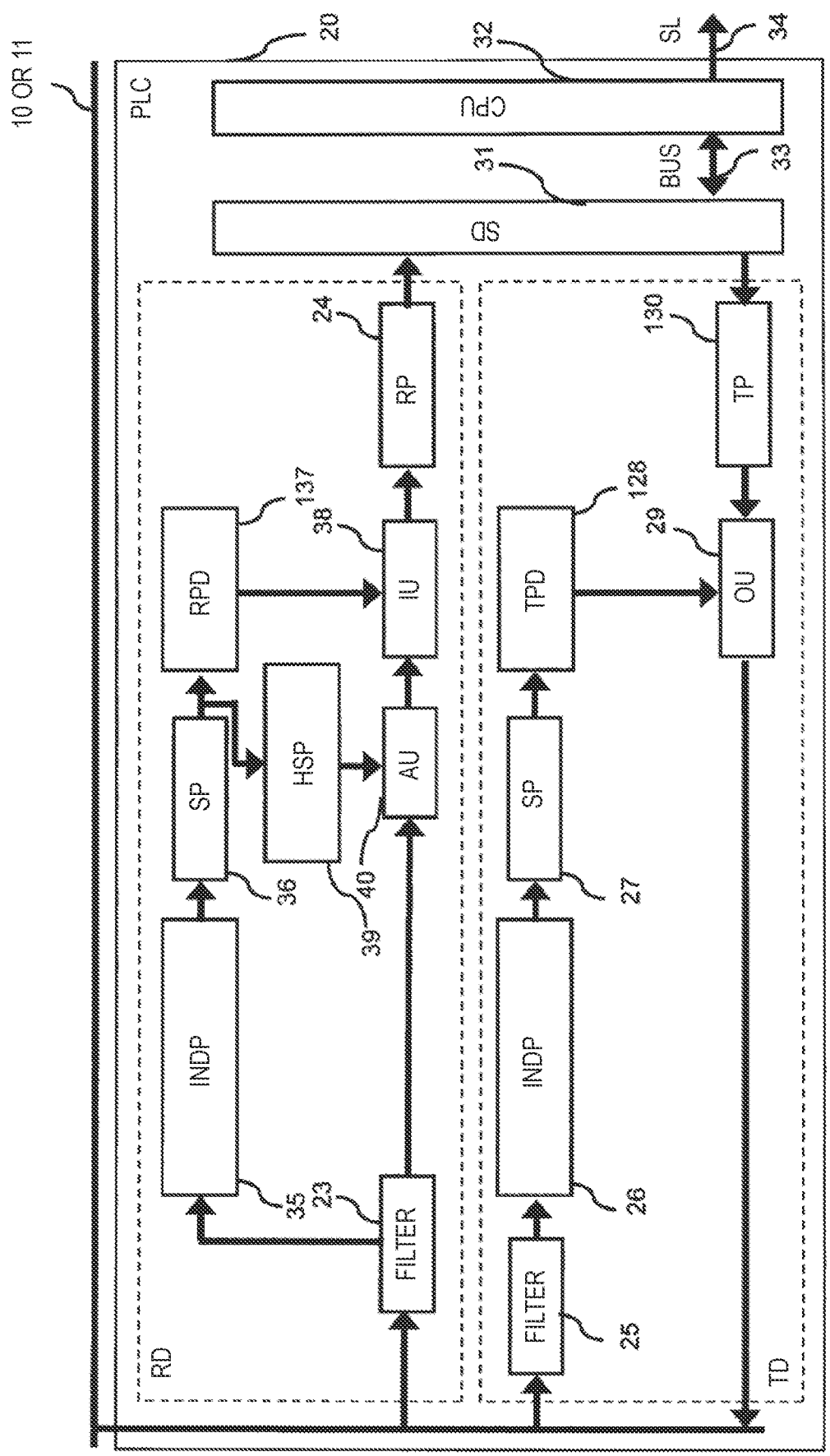
FIG. 13 is a block diagram of a power line communication device according to the third modified example of second embodiment.

FIG. 13 shows the configuration of the third modified example of second embodiment. The reception device (RD) according to the third modified example further includes a reception position determination unit (RPD) 137 and an input unit (IU) 38 in addition to the second modified example of second embodiment. Since configurations other than the reception position determination unit (RPD) 137 and the input unit (IU) 38 are the same as those of the second modified example of second embodiment, their explanations are omitted.

The reception position determination unit (RPD) 137 is a determination circuit for determining a PLC reception period, similarly to the reception position determination unit (RPD) 37, and is a circuit for determining a PLC communication standby period as a PLC reception period out of consecutive PLC communication executing periods and PLC communication standby periods, unlike the modified example of first embodiment. The input unit (IU) 38 is a circuit for inputting the output signal of the addition unit (AU) 40 to the reception processing unit (RP) 24 during the PLC reception period.

Operation of Third Modified Example of Second Embodiment

Reception position determination unit (RPD) 137, based on the result of the sync processing unit (SP) 36, determines the PLC receiving period to operate the receipt processing unit (RP) 24. The input unit (IU) 38 controls whether or not to input the PLC reception signal that has passed through the filter 23 and the addition unit (AU) 40 based on the result of the reception position determination unit (RPD) 137, and the reception processing unit (RP) 24 operates only during the PLC reception period during which the PLC reception signal that has been intensified is input, and the reception processing unit (RP) 24 writes the acquired PLC reception data to the storage device (SD) 31.

In the reception device (RD) of the third modified example, the receiving position determination unit (RPD) 137 determines the period in which the receiving processing unit (RP) 24 operates, the input unit (IU) 38, the receiving processing unit (RP) 24 operates only for the PLC receiving period in which the strengthened PLC reception signal is input, and other periods can stop operation, so power consumption can be reduced.

Third Embodiment

Figure 14:
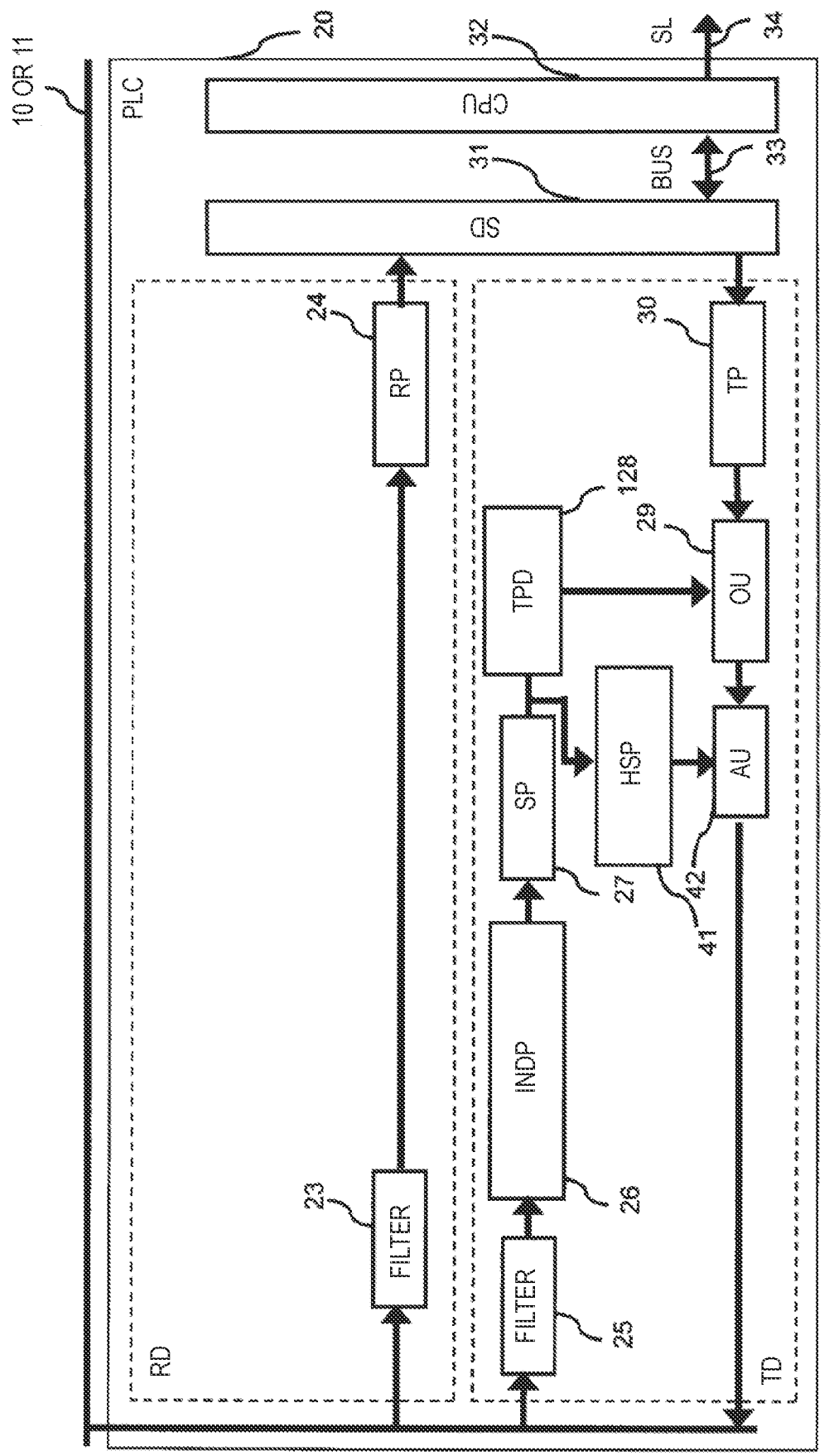
FIG. 14 is a configuration diagram of a power line communication device according to third embodiment.

FIG. 14 shows an exemplary configuration of a power line communication device (PLC) 20 according to third embodiment. Since the reception device (RD) according to third embodiment includes only the filter 23 and the reception processing unit (RP) 24, and is the same as first embodiment, their explanation is omitted. Compared to second embodiment, the transmission device (TD) according to present embodiment further comprises a half-wavelength shifting unit (HSP) 41 and an addition unit (AU) 42. Since the configuration of the transmission device (TD) except for the half-wavelength shifting unit (HSP) 41 and the adding unit (AU) 42 is the same as that of second embodiment, their explanations are omitted.

Similar to the half-wavelength shift processing unit (HSP) 39 of the reception device (RD), the half-wavelength shift processing unit (HSP) 41 is a circuit for generating a half-wavelength shift signal in which the phase corresponding to the half-wavelength of the inverter noise is shifted, and the addition unit (AU) 42 is a circuit for adding the half-wavelength shift signal and the PLC transmission signal that has passed through the output unit (OU) 29, similarly to the addition unit (AU) 40 of the reception device (RD).

Transmission Operation of Third Embodiment

The operation of the transmission device (TD) of the configuration of FIG. 14, in the same way as second embodiment, when the transmission position determination unit (TPD) 128 determines the period corresponding to the half-wavelength of the inverse noise as the PLC communication execution period, and determines the period corresponding to the half-wavelength of the inverter noise immediately following the period as the PLC communication standby period, when it is determined that the inverse noise exists in the power line 10 or 11 by the filter 25, the inverted noise detecting processing unit (INDP) 26, and the synchronization processing unit (SP) 27. The output unit (OU) 29 outputs the PLC transmission signal from the output unit (OU) 29 to the addition unit (AU) 42 during the PLC communication execution period based on the determination result of the transmission position determination unit (TPD) 128.

The half-wavelength shift processing unit (HSP) 41 generates a half-wavelength shift signal in which the phase corresponding to the half-wavelength of the inverter noise is shifted with respect to the inverter noise detected by the inverter noise detection processing unit (INDP) 26. The addition unit (AU) 42 generates an addition signal of the half-wavelength shift signal and the PLC transmission signal output from the output unit (OU) 29. The added signal is transmitted to the power line 10 or 11.

Figure 15:
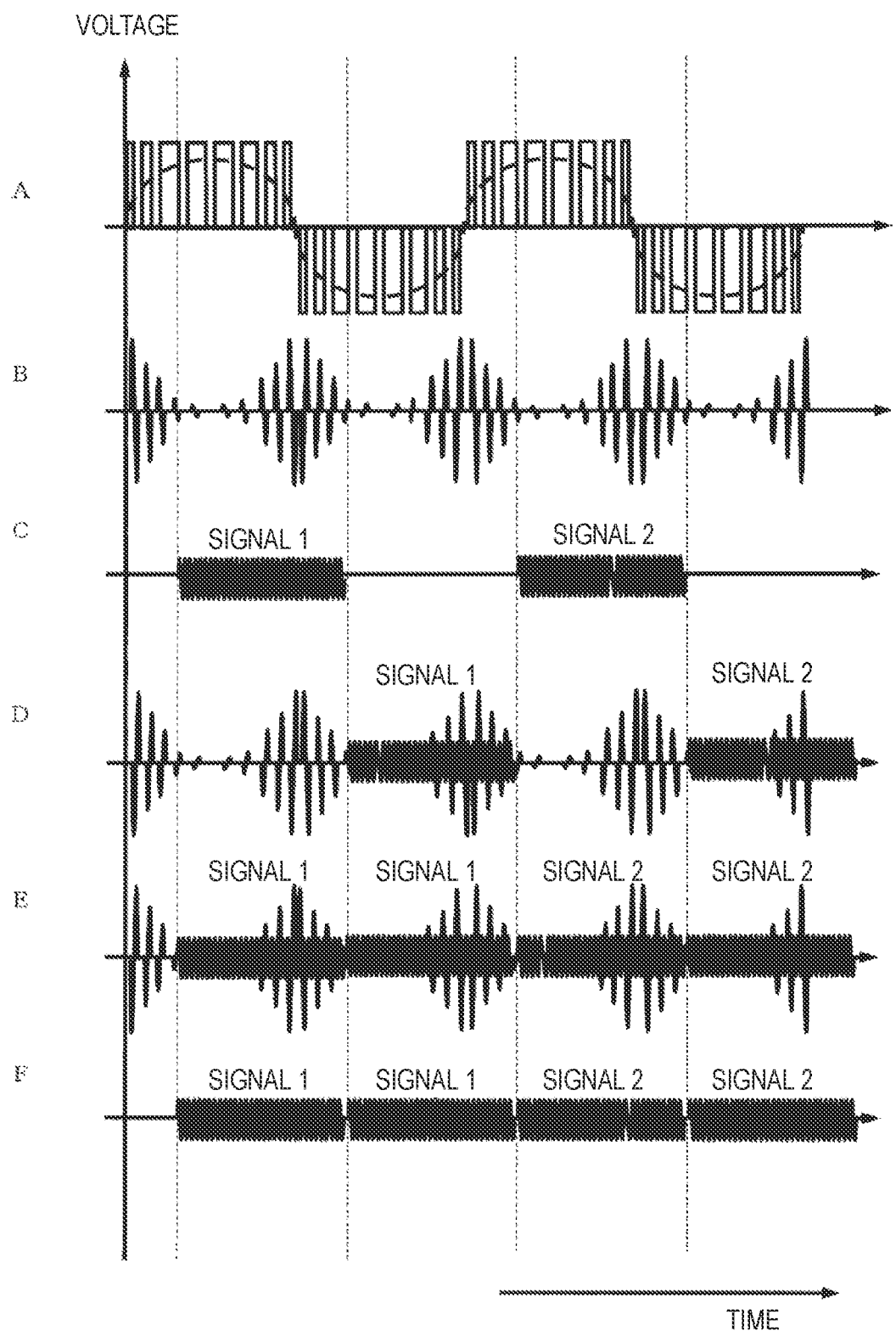
FIG. 15 is a diagram for explaining operation waveforms of the power line communication device according to third embodiment.

FIG. 15 shows an example of a waveform of a power line communication operation according to third embodiment. The A of FIG. 15 shows an output waveform of the DC/AC inverter (DC/AC INV) 18, the B of FIG. 15 shows an inverter noise waveform generated in the power line 10 or 11 by the operation of the DC/AC inverter (DC/AC INV) 18, the C of FIG. 15 shows an output waveform of the transmission processing unit (TP) 30 (output unit (OU) 29), the D of FIG. 15 shows an output waveform of the half-wavelength shift processing unit (HSP) 41, the E of FIG. 15 shows an output waveform of the addition unit (AU) 42, and the F of FIG. 15 shows a reception signal waveform in the PLC reception device (RD).

As a result of offsetting the noise components of the inverters that have been overlapped prior to the signals sent from the addition unit (AU) 42 of the transmission device (TD) and the noise of the inverters that occur on the power line 10 or 11, the effects of the noise of the inverters that occur on the power line 10 or 11 can be minimized, as shown in the F of FIG. 15. In addition, since the cycle of the inverter noise is the same as the cycle of the commercial power supply, it is possible to improve the noise tolerance against the periodic noise generated in the cycle of the commercial power supply.

Further, as compared with second embodiment, since the reception device (RD) does not need to include the inverter noise detection processing unit (INDP) 35 and the synchronization processing unit (SP) 36, there are effects of reducing the circuit area and power consumption.

First Modified Example of Third Embodiment

Figure 16:
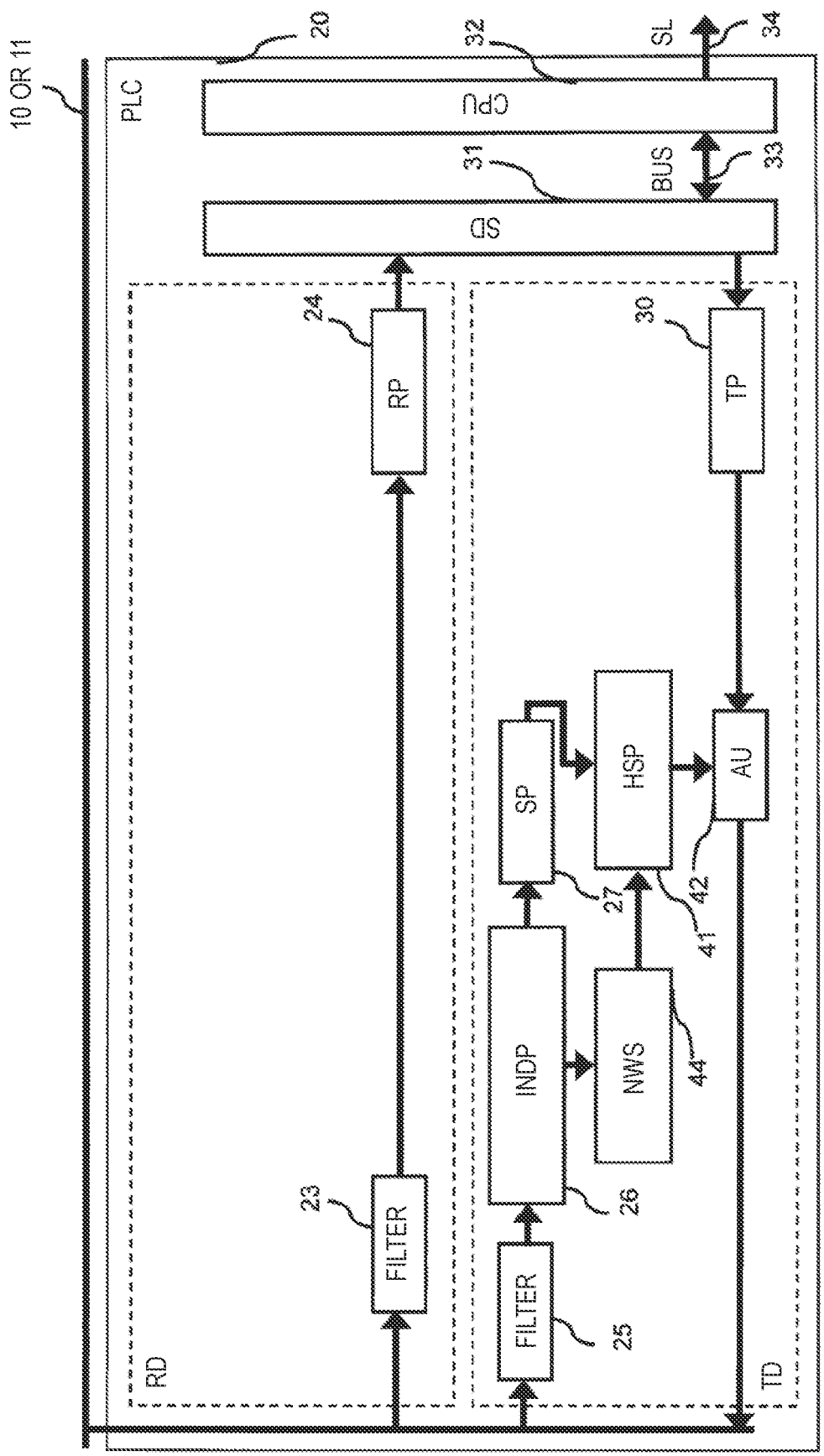
FIG. 16 is a configuration diagram of a power line communication device according to the first modified example of third embodiment.

FIG. 16 shows the configuration of the first modified example of third embodiment. In first modified example of third embodiment, the transmission device (TD) does not include the transmission position determination unit (TPD) 128 and the output unit (OU) 29 in third embodiment, and a noise waveform storage device (NWS) 44 is added. Since configurations other than the noise waveform storage device (NWS) 44 are the same as those of third embodiment, their explanations are omitted.

Similar to the noise waveform storage device (NWS) 43 in the first modified example of second embodiment, the noise waveform storage device (NWS) 44 of the transmission device (TD) is a device for holding and storing a waveform having only the inverter noise frequency component from which the PLC signal frequency component is removed from the inverter noise detected by the inverter noise detection processing unit (INDP) 26.

In the configuration of FIG. 16, the noise waveform storage device (NWS) 44 of the transmission device (TD) holds and stores a waveform including a lot of inverted noise in which the PLC communication signal is eliminated from the inverted noise waveform detected in the inverter noise detection processing unit (INDP) 26, or a lot of waveforms including the inverter noise of the power line 10 or 11 acquired when the PLC communication is not performed. The half-wavelength shift processing unit (HSP) 41 generates a half-wavelength shift signal in which the phase corresponding to the half-wavelength of the inverter noise is shifted, and the adding unit (AU) 42 adds the half-wavelength shift signal and the PLC transmission signal output from the transmission processing unit (TP) 30, and then transmits the resultant signal to the power line 10 or 11.

(Operation Waveform Example of First Modified Example of Third Embodiment)

Figure 17:
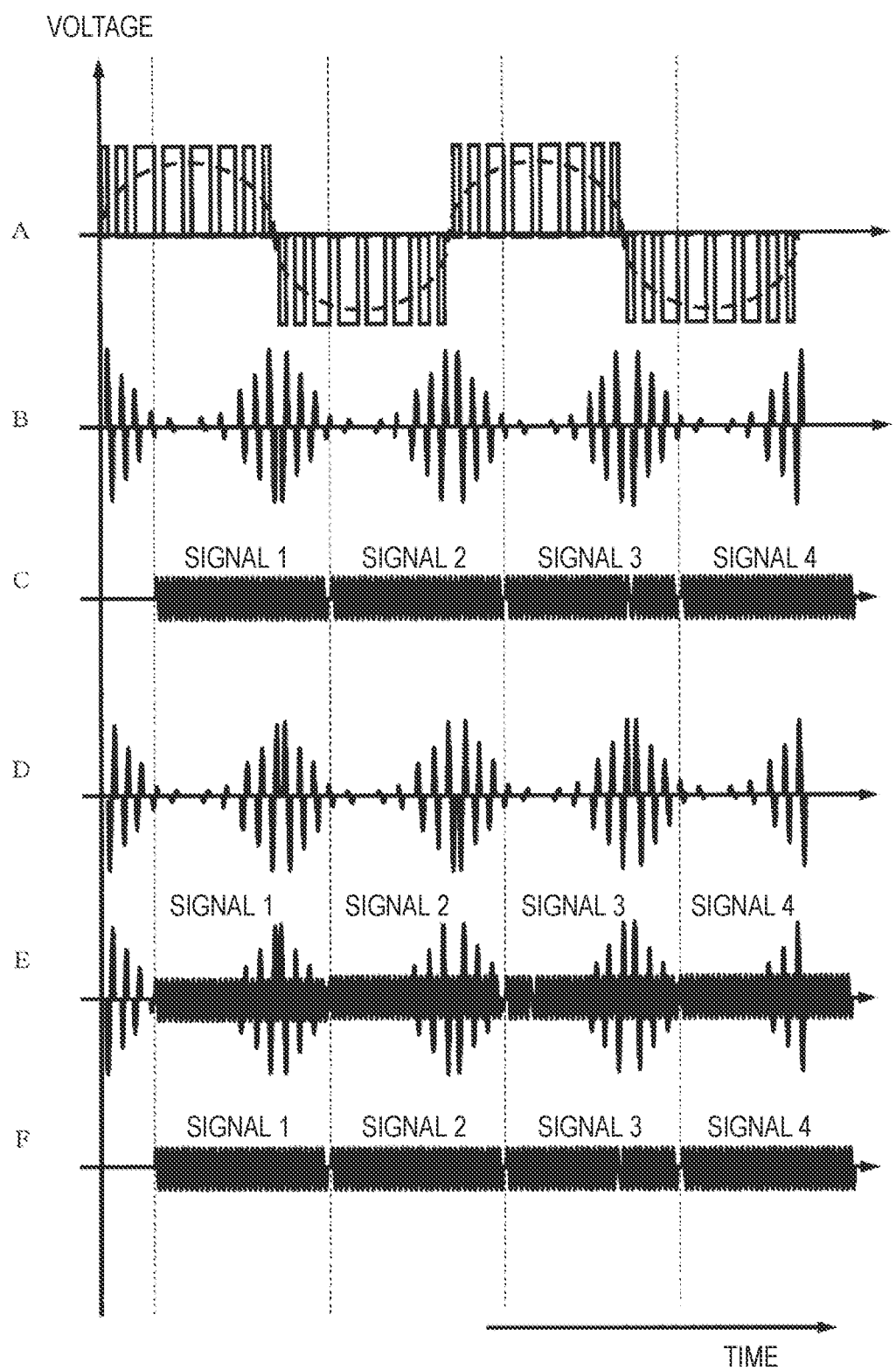
FIG. 17 is a diagram for explaining operation waveforms of the power line communication device according to the first modified example of third embodiment.

FIG. 17 shows an example of a waveform of a power line communication operation according to first modified example of third embodiment. The A in FIG. 17 shows an output waveform of the DC/AC inverter (DC/AC INV) 18, the B in FIG. 17 shows an inverter noise waveform generated in the power line 10 or 11 by the operation of the DC/AC inverter (DC/AC INV) 18, the C in FIG. 17 shows an output waveform of the transmission processing unit (TP) 30, the D in FIG. 17 shows an output waveform of the half-wavelength shift processing unit (HSP) 41, the E in FIG. 17 shows an output waveform of the addition unit (AU) 42, and the F in FIG. 17 shows a PLC reception signal waveform in the reception device (RD).

In the first modified example of third embodiment, as shown in the D in FIG. 17, since the output waveform of the half-wavelength shift processing unit (HSP) 41 includes a large amount of inverter noise, the addition processing of the addition unit (AU) 42 does not interfere with the PLC communication data included in the original PLC transmission signal. As a result, as shown in the F of FIG. 17, the inverter noise waveform components superimposed on the power line 10 or 11 in the PLC reception signal inputted to the reception device (RD) are cancelled. Further, the power line communication device can execute the PLC communication operation in the entire period without providing a PLC communication standby period or the like.

Effect of the First Modified Embodiment of Third Embodiment

In the first modified example of third embodiment, since the PLC communication standby period by third embodiment transmission position determination unit (TPD) 128 can be eliminated, the communication efficiency can be doubled as compared with the PLC communication standby period third embodiment. Since the transmission device (TD) does not need to include the transmission position determination unit (TPD) 128 and the output unit (OU) 29 as compared with third embodiment, there are effects of reducing the circuit area and the power consumption. Further, since the noise waveform storage device (NWS) 44 stores and holds a waveform containing a large amount of inverter noise, the waveform is acquired by an initialization operation or the like, and after the storage, the half-wavelength shift processing unit (HSP) 41 can read the waveform again, so that it is unnecessary to acquire a waveform containing a large amount of inverter noise each time, and the operation of the transmission device (TD) can be performed at high speed and efficiently.

Second Modified Example of Third Embodiment

Figure 18:
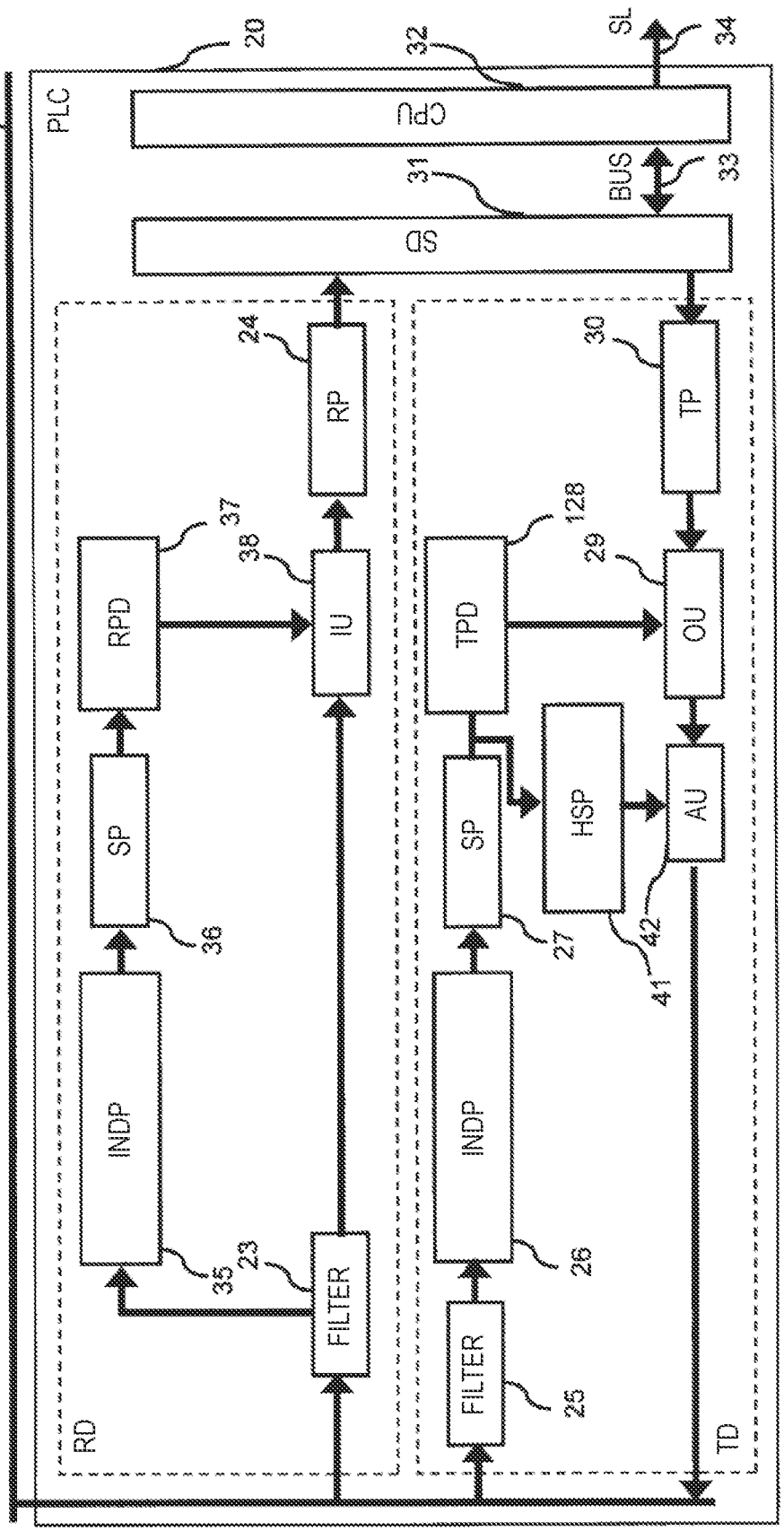
FIG. 18 is a block diagram of a power line communication device according to the second modified example of third embodiment.

FIG. 18 shows the configuration of second modified example of third embodiment. In second modified example of third embodiment, in addition to third embodiment configuration, the reception device (RD) further includes an inverter noise detection processing unit (INDP) 35, a synchronization processing unit (SP) 36, a reception position determination unit (RPD) 37, and an input unit (IU) 38. Since the configuration of the transmission device (TD) is the same as that of third embodiment, their explanations are omitted.

In the inverter noise detection processing unit (INDP) 35 of the reception device (RD), the synchronization processing unit (SP) 36, the reception position determination unit (RPD) 37, and the input unit (IU) 38 are the same as the modified example of first embodiment.

Operations of Second Modified Example of Third Embodiment

The operation of the reception device (RD) in the configuration of FIG. 18, the inverter noise detection processing unit (INDP) 35 performs the inspection of the inverter noise from the PLC reception signal passed through filter 23, to determine whether there is any inverted noise. When the inverter noise detection processing unit (INDP) 35 determines that there is inverter noise, the synchronization processing unit (SP) 36 synchronizes with the waveform of the inverter noise. The reception position determination unit (RPD) 37 determines the PLC reception period based on the result of the synchronization processing unit (SP) 36, and the reception processing unit (RP) 24 operates during the PLC reception period.

In the second modified example of third embodiment, as shown in the F of FIG. 15, since the same signal outputted from the transmission processing unit (TP) 30 is received twice in the period in which the period corresponding to the half cycle of the inverter noise is two consecutive times, the input unit (IU) 38 can operate only in the period corresponding to the half cycle of the second inverter noise, for example.

(Effect of Second Modified Example of Third Embodiment)

In the reception device (RD) of the second modified example of third embodiment, the reception position determination unit (RPD) 37 determines the PLC reception period, the input unit (IU) 38 operates only in a period corresponding to a half cycle of the inverter noise, and the reception processing unit (RP) 24 stops the operation in another period, therefore the power consumption can be reduced.

Any of the configurations of the present system can be implemented in either hardware or software. In addition, even when a specific numerical value example is described, it may be a numerical value exceeding the specific numerical value, or may be a numerical value less than the specific numerical value, except when it is theoretically obviously limited to the numerical value.

Although the embodiment has been described above, the power line communication device described above can be described as follows.

A power line communication device comprising: an inverter noise detection processing unit for detecting inverter noise by a DC/AC inverter of a power line; a noise waveform storage device for holding a waveform substantially containing inverter noise in which signal components of power line communication are removed from the inverter noise; a half-wavelength shift processing unit for generating a half-wavelength shift signal in which a phase corresponding to a half-wavelength of the inverter noise is shifted with respect to a waveform substantially containing the inverter noise; a transmission processing unit for generating a transmission signal from transmission data; and an addition unit for generating an addition signal obtained by adding the transmission signal and the half-wavelength shift signal, and outputting the addition signal to the power line.

What is claimed is:

1. A power line communication device comprising:
   an inverter noise detection processing unit for detecting inverter noise by a DC/AC inverter;
   a half-wavelength shift processing unit for generating a half-wavelength shift signal in which a phase corresponding to a half-wavelength of the inverter noise is shifted with respect to a received signal from a power line;
   an addition unit for generating an addition signal in which the received signal and the half-wavelength shift signal are added; and
   a reception processing unit for acquiring received data based on the addition signal.

2. The power line communication device according to claim 1, further comprising:
   a noise waveform storage device for retaining a waveform substantially containing a large amount of inverter noise,
   wherein the half-wavelength shift processing unit generates the half-wavelength shift signal by shifting a phase corresponding to a half-wavelength of the inverter noise with respect to a waveform substantially containing a large amount of inverter noise, and
   wherein the half-wavelength shift processing unit removes frequency components of the received signal from the inverter noise.

3. The power line communication device according to claim 1, further comprising:
   a transmission processing unit for generating a transmission signal to be output to the power line;
   a transmission position determination unit for determining a transmission period of the transmission signal; and
   an output unit for outputting the transmission signal in the transmission period,
   wherein the transmission position determination unit has a first period corresponding to a half-wavelength of the inverter noise as a transmission period.

4. The power line communication device according to claim 3, wherein the same transmit signals as the first period are outputted in a second period corresponding to a half-wavelength of the inverter noise, which is consecutive to the first period.

5. The power line communication device according to claim 4, further comprising:
   a reception position determination unit for determining a reception period of the reception signal;
   an input unit for inputting the reception signal in the reception period; and
   a reception processing unit for acquiring reception data based on an input signal from the input unit,
   wherein the reception position determination unit has a period corresponding to the second period as the reception period.

* * * * *